United States Patent
Natarajan et al.

(10) Patent No.: US 10,404,698 B1
(45) Date of Patent: Sep. 3, 2019

(54) METHODS FOR ADAPTIVE ORGANIZATION OF WEB APPLICATION ACCESS POINTS IN WEBTOPS AND DEVICES THEREOF

(71) Applicant: F5 Networks, Inc., Seattle, WA (US)

(72) Inventors: Ravi Natarajan, Fremont, CA (US); Konstantin Bredelev, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 113 days.

(21) Appl. No.: 15/282,110

(22) Filed: Sep. 30, 2016

Related U.S. Application Data

(60) Provisional application No. 62/279,439, filed on Jan. 15, 2016.

(51) Int. Cl.
  *H04L 29/06* (2006.01)
  *H04L 29/08* (2006.01)
  *H04L 12/24* (2006.01)

(52) U.S. Cl.
  CPC .......... *H04L 63/0876* (2013.01); *H04L 67/02* (2013.01); *H04L 67/143* (2013.01);
  (Continued)

(58) Field of Classification Search
  CPC .... G06F 21/11; G06F 17/30864; H04L 41/50; H04L 63/0227
  (Continued)

(56) References Cited

U.S. PATENT DOCUMENTS 3,950,735 A   4/1976  Patel
4,438,511 A   3/1984  Baran
(Continued)

FOREIGN PATENT DOCUMENTS

AU   2003300350 A1   7/2004
CA       2080530       4/1994
(Continued)

OTHER PUBLICATIONS

Almesberger Werner, et al., "Application Requested IP over ATM (Arequipa) and its use in the Web," Laboratoire de Reseaux de Communication, pp. 1-9, Swiss Federal Institute of Technology, Lusanne, Switzerland. (1996).
(Continued)

*Primary Examiner* — Bryan F Wright
(74) *Attorney, Agent, or Firm* — Pepper Hamilton LLP

(57) ABSTRACT

Methods, non-transitory computer readable media, access policy management apparatuses, and enterprise network systems that facilitate adaptive organization of web application access points in webtops are disclosed. With this technology, access points for web applications are more effectively presented in webtops to facilitate more efficient access to web applications by clients. In particular, this technology utilizes historical application access pattern data to determine a subset of allowed web applications most likely to be accessed in a current session, and generates and provides a webtop with access points for web applications organized based on the determined subset of the allowed web applications. Thereby, this technology facilitates adaptive webtops that reduce the amount of time required to locate access points for web applications and improve user productivity.

20 Claims, 5 Drawing Sheets

(52) U.S. Cl.
CPC ............. *H04L 67/22* (2013.01); *H04L 67/42* (2013.01); *H04L 41/50* (2013.01)

(58) Field of Classification Search
USPC ........................................................ 726/22
See application file for complete search history.

(56) References Cited

U.S. PATENT DOCUMENTS

| | | |
|---|---|---|
| 4,644,532 A | 2/1987 | George et al. |
| 4,701,745 A | 10/1987 | Waterworth |
| 4,736,369 A | 4/1988 | Barzilai et al. |
| 4,750,171 A | 6/1988 | Kedar et al. |
| 4,893,307 A | 1/1990 | McKay et al. |
| 4,897,781 A | 1/1990 | Chang et al. |
| 4,922,486 A | 5/1990 | Lidinsky et al. |
| 4,928,247 A | 5/1990 | Doyle et al. |
| 4,941,089 A | 7/1990 | Fischer |
| 4,953,159 A | 8/1990 | Hayden et al. |
| 4,965,772 A | 10/1990 | Daniel et al. |
| 4,993,030 A | 2/1991 | Krakauer et al. |
| 5,014,221 A | 5/1991 | Mogul |
| 5,021,949 A | 6/1991 | Morten et al. |
| 5,023,826 A | 6/1991 | Patel |
| 5,029,164 A | 7/1991 | Goldstein et al. |
| 5,053,953 A | 10/1991 | Patel |
| 5,159,592 A | 10/1992 | Perkins |
| 5,167,024 A | 11/1992 | Smith et al. |
| 5,181,200 A | 1/1993 | Harrison |
| 5,218,695 A | 6/1993 | Noveck et al. |
| 5,241,625 A | 8/1993 | Epard et al. |
| 5,282,201 A | 1/1994 | Frank et al. |
| 5,299,312 A | 3/1994 | Rocco, Jr. |
| 5,303,368 A | 4/1994 | Kotaki |
| 5,307,456 A | 4/1994 | MacKay |
| 5,315,698 A | 5/1994 | Case et al. |
| 5,327,529 A | 7/1994 | Fults et al. |
| 5,345,588 A | 9/1994 | Greenwood et al. |
| 5,367,635 A | 11/1994 | Bauer et al. |
| 5,371,852 A | 12/1994 | Attanasio et al. |
| 5,392,223 A | 2/1995 | Caci |
| 5,406,502 A | 4/1995 | Haramaty |
| 5,410,543 A | 4/1995 | Seitz et al. |
| 5,442,637 A | 8/1995 | Nguyen |
| 5,446,736 A | 8/1995 | Gleeson et al. |
| 5,473,362 A | 12/1995 | Fitzgerald et al. |
| 5,475,856 A | 12/1995 | Dally |
| 5,475,857 A | 12/1995 | Daily |
| 5,511,177 A | 4/1996 | Kagimasa et al. |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,537,585 A | 7/1996 | Blickenstaff et al. |
| 5,541,927 A | 7/1996 | Kristol et al. |
| 5,548,724 A | 8/1996 | Akizawa et al. |
| 5,550,816 A | 8/1996 | Hardwick et al. |
| 5,550,965 A | 8/1996 | Gabbe et al. |
| 5,564,070 A | 10/1996 | Want et al. |
| 5,566,225 A | 10/1996 | Haas |
| 5,572,674 A | 11/1996 | Ernst |
| 5,581,764 A | 12/1996 | Fitzgerald et al. |
| 5,583,995 A | 12/1996 | Gardner et al. |
| 5,586,260 A | 12/1996 | Hu |
| 5,590,320 A | 12/1996 | Maxey |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,623,603 A | 4/1997 | Jiang et al. |
| 5,649,194 A | 7/1997 | Miller et al. |
| 5,649,200 A | 7/1997 | Leblang et al. |
| 5,655,081 A | 8/1997 | Bonnell et al. |
| 5,657,390 A | 8/1997 | Elgamal et al. |
| 5,663,018 A | 9/1997 | Cummings et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,734,825 A | 3/1998 | Lauck et al. |
| 5,737,416 A | 4/1998 | Cooper et al. |
| 5,752,023 A | 5/1998 | Chourci et al. |
| 5,757,795 A | 5/1998 | Schnell |
| 5,758,085 A | 5/1998 | Kouoheris et al. |
| 5,761,484 A | 6/1998 | Agarwal et al. |
| 5,765,915 A | 6/1998 | Lee |
| 5,768,257 A | 6/1998 | Khacherian et al. |
| 5,768,423 A | 6/1998 | Aref et al. |
| 5,774,660 A | 6/1998 | Brendel et al. |
| 5,790,554 A | 8/1998 | Pitcher et al. |
| 5,793,768 A | 8/1998 | Keshav |
| 5,802,052 A | 9/1998 | Venkataraman |
| 5,806,061 A | 9/1998 | Chaudhuri et al. |
| 5,809,235 A | 9/1998 | Sharma et al. |
| 5,812,550 A | 9/1998 | Sohn et al. |
| 5,822,543 A | 10/1998 | Dunn et al. |
| 5,825,772 A | 10/1998 | Dobbins et al. |
| 5,832,283 A | 11/1998 | Chou et al. |
| 5,832,496 A | 11/1998 | Anand et al. |
| 5,832,522 A | 11/1998 | Blickenstaff et al. |
| 5,838,682 A | 11/1998 | Dekelbaum et al. |
| 5,838,920 A | 11/1998 | Rosborough |
| 5,838,970 A | 11/1998 | Thomas |
| 5,862,325 A | 1/1999 | Reed et al. |
| 5,864,678 A | 1/1999 | Riddle |
| 5,868,190 A | 2/1999 | Willard, Jr. et al. |
| 5,875,296 A | 2/1999 | Shi et al. |
| 5,884,303 A | 3/1999 | Brown |
| 5,889,935 A | 3/1999 | Ofek et al. |
| 5,892,914 A | 4/1999 | Pitts |
| 5,892,932 A | 4/1999 | Kim |
| 5,893,086 A | 4/1999 | Schmuck et al. |
| 5,897,638 A | 4/1999 | Lasser et al. |
| 5,898,674 A | 4/1999 | Mawhinney et al. |
| 5,901,327 A | 5/1999 | Ofek |
| 5,903,355 A | 5/1999 | Schwarz |
| 5,905,990 A | 5/1999 | Inglett |
| 5,915,332 A | 6/1999 | Young et al. |
| 5,917,998 A | 6/1999 | Cabrera et al. |
| 5,919,247 A | 7/1999 | Van Hoff et al. |
| 5,920,701 A | 7/1999 | Miller et al. |
| 5,920,873 A | 7/1999 | Van Huben et al. |
| 5,926,816 A | 7/1999 | Bauer et al. |
| 5,933,412 A | 8/1999 | Choudhury et al. |
| 5,936,939 A | 8/1999 | Des Jardins et al. |
| 5,936,940 A | 8/1999 | Marin et al. |
| 5,937,169 A | 8/1999 | Connery et al. |
| 5,937,406 A | 8/1999 | Balabine et al. |
| 5,938,733 A | 8/1999 | Heimsoth et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,974 A | 9/1999 | Badt et al. |
| 5,959,990 A | 9/1999 | Frantz et al. |
| 5,968,176 A | 10/1999 | Nessett et al. |
| 5,974,028 A | 10/1999 | Ramakrishnan |
| 5,974,460 A | 10/1999 | Maddalozzo, Jr. et al. |
| 5,978,848 A | 11/1999 | Maddalozzo, Jr. et al. |
| 5,983,227 A | 11/1999 | Nazem et al. |
| 5,983,281 A | 11/1999 | Ogle et al. |
| 5,988,847 A | 11/1999 | McLaughlin et al. |
| 5,991,302 A | 11/1999 | Berl et al. |
| 5,995,491 A | 11/1999 | Richter et al. |
| 5,999,518 A | 12/1999 | Nattkemper et al. |
| 5,999,664 A | 12/1999 | Mahoney et al. |
| 6,003,030 A | 12/1999 | Kenner et al. |
| 6,005,843 A | 12/1999 | Kamiya |
| 6,006,260 A | 12/1999 | Barrick, Jr. et al. |
| 6,006,264 A | 12/1999 | Colby et al. |
| 6,012,083 A | 1/2000 | Savitzky et al. |
| 6,026,452 A | 2/2000 | Pitts |
| 6,026,500 A | 2/2000 | Topff et al. |
| 6,028,857 A | 2/2000 | Poor |

(56) References Cited

U.S. PATENT DOCUMENTS

| | | |
|---|---|---|
| 6,029,168 A | 2/2000 | Frey |
| 6,029,175 A | 2/2000 | Chow et al. |
| 6,041,365 A | 3/2000 | Kleinerman |
| 6,044,061 A | 3/2000 | Aybay et al. |
| 6,044,367 A | 3/2000 | Wolff |
| 6,044,444 A | 3/2000 | Ofek |
| 6,047,129 A | 4/2000 | Frye |
| 6,047,356 A | 4/2000 | Anderson et al. |
| 6,051,169 A | 4/2000 | Brown et al. |
| 6,058,480 A | 5/2000 | Brown |
| 6,061,796 A | 5/2000 | Chen et al. |
| 6,065,092 A | 5/2000 | Roy |
| 6,067,558 A | 5/2000 | Wendt et al. |
| 6,072,942 A | 6/2000 | Stockwell et al. |
| 6,076,113 A | 6/2000 | Ramanathan et al. |
| 6,078,582 A | 6/2000 | Curry et al. |
| 6,078,929 A | 6/2000 | Rao |
| 6,078,956 A | 6/2000 | Bryant et al. |
| 6,085,234 A | 7/2000 | Pitts et al. |
| 6,088,694 A | 7/2000 | Burns et al. |
| 6,092,196 A | 7/2000 | Reiche |
| 6,101,543 A | 8/2000 | Alden et al. |
| 6,104,706 A | 8/2000 | Richter et al. |
| 6,108,697 A | 8/2000 | Raymond et al. |
| 6,108,703 A | 8/2000 | Leighton et al. |
| 6,111,876 A | 8/2000 | Frantz et al. |
| 6,112,085 A | 8/2000 | Garner et al. |
| 6,128,279 A | 10/2000 | O'Neil et al. |
| 6,128,627 A | 10/2000 | Mattis et al. |
| 6,128,657 A | 10/2000 | Okanoya et al. |
| 6,128,717 A | 10/2000 | Harrison et al. |
| 6,131,110 A | 10/2000 | Bates et al. |
| 6,144,640 A | 11/2000 | Simpson et al. |
| 6,144,986 A | 11/2000 | Silver |
| 6,147,986 A | 11/2000 | Orsic |
| 6,154,777 A | 11/2000 | Ebrahim |
| 6,157,950 A | 12/2000 | Krishnan |
| 6,158,007 A | 12/2000 | Moreh et al. |
| 6,160,812 A | 12/2000 | Bauman et al. |
| 6,160,874 A | 12/2000 | Dickerman et al. |
| 6,161,145 A | 12/2000 | Bainbridge et al. |
| 6,161,185 A | 12/2000 | Guthrie et al. |
| 6,167,449 A | 12/2000 | Arnold et al. |
| 6,170,022 B1 | 1/2001 | Linville et al. |
| 6,170,075 B1 | 1/2001 | Schuster et al. |
| 6,178,423 B1 | 1/2001 | Douceur et al. |
| 6,181,336 B1 | 1/2001 | Chiu et al. |
| 6,181,711 B1 | 1/2001 | Zhang et al. |
| 6,182,139 B1 | 1/2001 | Brendel |
| 6,192,051 B1 | 2/2001 | Lipman et al. |
| 6,198,920 B1 | 3/2001 | Doviak et al. |
| 6,202,156 B1 | 3/2001 | Kalajan |
| 6,215,774 B1 | 4/2001 | Knauerhase et al. |
| 6,223,206 B1 | 4/2001 | Dan et al. |
| 6,233,612 B1 | 5/2001 | Fruchtman et al. |
| 6,233,648 B1 | 5/2001 | Tomita |
| 6,235,188 B1 | 5/2001 | Nakamura et al. |
| 6,236,643 B1 | 5/2001 | Kerstein |
| 6,237,008 B1 | 5/2001 | Beal et al. |
| 6,169,987 B1 | 6/2001 | Knoblock et al. |
| 6,246,684 B1 | 6/2001 | Chapman et al. |
| 6,252,851 B1 | 6/2001 | Siu et al. |
| 6,253,226 B1 | 6/2001 | Chidambaran et al. |
| 6,253,230 B1 | 6/2001 | Couland et al. |
| 6,253,326 B1 | 6/2001 | Lincke et al. |
| 6,256,031 B1 | 7/2001 | Meijer et al. |
| 6,256,673 B1 | 7/2001 | Gayman |
| 6,259,405 B1 | 7/2001 | Stewart et al. |
| 6,259,705 B1 | 7/2001 | Takahashi et al. |
| 6,260,070 B1 | 7/2001 | Shah |
| 6,263,368 B1 | 7/2001 | Martin |
| 6,282,172 B1 | 8/2001 | Robles et al. |
| 6,282,610 B1 | 8/2001 | Bergsten |
| 6,289,012 B1 | 9/2001 | Harrington et al. |
| 6,289,345 B1 | 9/2001 | Yasue |
| 6,289,382 B1 | 9/2001 | Bowman-Amuah |
| 6,292,172 B1 | 9/2001 | Makhlouf |
| 6,292,832 B1 | 9/2001 | Shah et al. |
| 6,298,380 B1 | 10/2001 | Coile et al. |
| 6,304,913 B1 | 10/2001 | Rune |
| 6,308,162 B1 | 10/2001 | Ouimet et al. |
| 6,308,213 B1 | 10/2001 | Valencia |
| 6,314,406 B1 | 11/2001 | O'Hagan et al. |
| 6,317,415 B1 | 11/2001 | Darnell et al. |
| 6,324,581 B1 | 11/2001 | Xu et al. |
| 6,324,582 B1 | 11/2001 | Sridhar et al. |
| 6,327,622 B1 | 12/2001 | Jindal et al. |
| 6,329,985 B1 | 12/2001 | Tamer et al. |
| 6,330,574 B1 | 12/2001 | Murashita |
| 6,332,163 B1 | 12/2001 | Bowman-Amuah |
| 6,333,931 B1 | 12/2001 | LaPier et al. |
| 6,338,082 B1 | 1/2002 | Schneider |
| 6,339,785 B1 | 1/2002 | Feigenbaum |
| 6,339,832 B1 | 1/2002 | Bowman-Amuah |
| 6,343,318 B1 | 1/2002 | Hawkins et al. |
| 6,343,324 B1 | 1/2002 | Hubis et al. |
| 6,347,339 B1 | 2/2002 | Morris et al. |
| 6,349,343 B1 | 2/2002 | Foody et al. |
| 6,353,848 B1 | 3/2002 | Morris |
| 6,359,882 B1 | 3/2002 | Robles et al. |
| 6,360,270 B1 | 3/2002 | Cherkasova et al. |
| 6,363,056 B1 | 3/2002 | Beigi et al. |
| 6,363,429 B1 | 3/2002 | Ketcham |
| 6,370,527 B1 | 4/2002 | Singhal |
| 6,370,543 B2 | 4/2002 | Hoffert et al. |
| 6,374,263 B1 | 4/2002 | Hunger et al. |
| 6,374,300 B2 | 4/2002 | Masters |
| 6,374,336 B1 | 4/2002 | Peters et al. |
| 6,381,215 B1 | 4/2002 | Hamilton et al. |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,396,833 B1 | 5/2002 | Zhang et al. |
| 6,397,246 B1 | 5/2002 | Wolfe |
| 6,397,259 B1 | 5/2002 | Lincke et al. |
| 6,400,996 B1 | 6/2002 | Hoffberg et al. |
| 6,405,252 B1 | 6/2002 | Gupta et al. |
| 6,411,986 B1 | 6/2002 | Susai et al. |
| 6,412,004 B1 | 6/2002 | Chen et al. |
| 6,421,726 B1 | 7/2002 | Kenner et al. |
| 6,424,659 B2 | 7/2002 | Viswanadham et al. |
| 6,430,562 B1 | 8/2002 | Kardos et al. |
| 6,434,081 B1 | 8/2002 | Johnson et al. |
| 6,434,568 B1 | 8/2002 | Bowman-Amuah |
| 6,434,628 B1 | 8/2002 | Bowman-Amuah |
| 6,438,102 B1 | 8/2002 | Chui et al. |
| 6,438,594 B1 | 8/2002 | Bowman-Amuah |
| 6,438,595 B1 | 8/2002 | Blumenau et al. |
| 6,442,748 B1 | 8/2002 | Bowman-Amuah |
| 6,446,108 B1 | 9/2002 | Rosenberg et al. |
| 6,449,283 B1 | 9/2002 | Chao et al. |
| 6,452,915 B1 | 9/2002 | Jorgensen |
| 6,457,052 B1 | 9/2002 | Markowitz et al. |
| 6,463,470 B1 | 10/2002 | Mohaban et al. |
| 6,466,580 B1 | 10/2002 | Leung |
| 6,466,984 B1 | 10/2002 | Naveh et al. |
| 6,469,983 B2 | 10/2002 | Narayana et al. |
| 6,470,021 B1 | 10/2002 | Daines et al. |
| 6,473,794 B1 | 10/2002 | Guheen et al. |
| 6,473,802 B2 | 10/2002 | Masters |
| 6,477,544 B1 | 11/2002 | Bolosky et al. |
| 6,477,665 B1 | 11/2002 | Bowman-Amuah |
| 6,480,476 B1 | 11/2002 | Willars |
| 6,484,261 B1 | 11/2002 | Wiegel |
| 6,487,561 B1 | 11/2002 | Ofek et al. |
| 6,487,598 B1 | 11/2002 | Valencia |
| 6,490,624 B1 | 12/2002 | Sampson et al. |
| 6,493,804 B1 | 12/2002 | Soltis et al. |
| 6,496,481 B1 | 12/2002 | Wu et al. |
| 6,496,520 B1 | 12/2002 | Acosta |
| 6,496,850 B1 | 12/2002 | Bowman-Amuah |
| 6,496,856 B1 | 12/2002 | Kenner et al. |
| 6,499,107 B1 | 12/2002 | Gleichauf et al. |
| 6,502,102 B1 | 12/2002 | Haswell et al. |

(56) References Cited

U.S. PATENT DOCUMENTS

| | | |
|---|---|---|
| 6,502,125 B1 | 12/2002 | Kenner et al. |
| 6,502,135 B1 | 12/2002 | Munger et al. |
| 6,502,213 B1 | 12/2002 | Bowman-Amuah |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,516,315 B1 | 2/2003 | Gupta |
| 6,516,350 B1 | 2/2003 | Lumelsky et al. |
| 6,516,351 B2 | 2/2003 | Borr |
| 6,519,571 B1 | 2/2003 | Guheen et al. |
| 6,519,643 B1 | 2/2003 | Foulkes et al. |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,539,429 B2 | 3/2003 | Rakavy et al. |
| 6,542,909 B1 | 4/2003 | Tamer et al. |
| 6,542,936 B1 | 4/2003 | Mayle et al. |
| 6,546,425 B1 | 4/2003 | Hanson et al. |
| 6,549,916 B1 | 4/2003 | Sedlar |
| 6,549,949 B1 | 4/2003 | Bowman-Amuah |
| 6,550,057 B1 | 4/2003 | Bowman-Amuah |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,560,243 B1 | 5/2003 | Mogul |
| 6,571,282 B1 | 5/2003 | Bowman-Amuah |
| 6,573,907 B1 | 6/2003 | Madrane |
| 6,578,068 B1 | 6/2003 | Bowman-Amuah |
| 6,578,069 B1 | 6/2003 | Hopmann et al. |
| 6,578,076 B1 | 6/2003 | Putzolu |
| 6,584,569 B2 | 6/2003 | Reshef et al. |
| 6,587,437 B1 | 7/2003 | Lee et al. |
| 6,590,588 B2 | 7/2003 | Lincke et al. |
| 6,595,417 B2 | 7/2003 | O'Hagan et al. |
| 6,601,084 B1 | 7/2003 | Bhaskaran et al. |
| 6,601,101 B1 | 7/2003 | Lee et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,603,771 B1 | 8/2003 | Raza |
| 6,606,660 B1 | 8/2003 | Bowman-Amuah |
| 6,606,663 B1 | 8/2003 | Liao et al. |
| 6,606,744 B1 | 8/2003 | Mikurak |
| 6,609,128 B1 | 8/2003 | Underwood |
| 6,611,522 B1 | 8/2003 | Zheng et al. |
| 6,612,490 B1 | 9/2003 | Herrendoerfer et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,615,267 B1 | 9/2003 | Whalen et al. |
| 6,618,379 B1 | 9/2003 | Ramamurthy et al. |
| 6,618,761 B2 | 9/2003 | Munger et al. |
| 6,622,172 B1 | 9/2003 | Tam |
| 6,624,766 B1 | 9/2003 | Possley et al. |
| 6,625,177 B1 | 9/2003 | Raza |
| 6,631,422 B1 | 10/2003 | Althaus et al. |
| 6,633,878 B1 | 10/2003 | Underwood |
| 6,633,886 B1 | 10/2003 | Chong et al. |
| 6,636,242 B2 | 10/2003 | Bowman-Amuah |
| 6,636,503 B1 | 10/2003 | Shiran et al. |
| 6,636,894 B1 | 10/2003 | Short et al. |
| 6,640,238 B1 | 10/2003 | Bowman-Amuah |
| 6,640,248 B1 | 10/2003 | Jorgensen |
| 6,640,249 B1 | 10/2003 | Bowman-Amuah |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley et al. |
| 6,657,954 B1 | 12/2003 | Bird et al. |
| 6,658,021 B1 | 12/2003 | Bromley et al. |
| 6,658,624 B1 | 12/2003 | Savitzky et al. |
| 6,661,802 B1 | 12/2003 | Homberg et al. |
| 6,665,706 B2 | 12/2003 | Kenner et al. |
| 6,667,984 B1 | 12/2003 | Chao et al. |
| 6,671,818 B1 | 12/2003 | Mikurak |
| 6,680,976 B1 | 1/2004 | Chen et al. |
| 6,683,873 B1 | 1/2004 | Kwok et al. |
| 6,687,227 B1 | 2/2004 | Li et al. |
| 6,687,732 B1 | 2/2004 | Bector et al. |
| 6,687,745 B1 | 2/2004 | Franco et al. |
| 6,691,165 B1 | 2/2004 | Bruck et al. |
| 6,691,232 B1 | 2/2004 | Wood et al. |
| 6,694,517 B1 | 2/2004 | James et al. |
| 6,697,368 B2 | 2/2004 | Chang et al. |
| 6,697,871 B1 | 2/2004 | Hansen |
| 6,697,984 B1 | 2/2004 | Sim et al. |
| 6,701,415 B1 | 3/2004 | Hendren, III |
| 6,701,514 B1 | 3/2004 | Haswell et al. |
| 6,704,755 B2 | 3/2004 | Midgley et al. |
| 6,704,873 B1 | 3/2004 | Underwood |
| 6,708,187 B1 | 3/2004 | Shanumgam et al. |
| 6,708,220 B1 | 3/2004 | Olin |
| 6,711,164 B1 | 3/2004 | Le et al. |
| 6,711,166 B1 | 3/2004 | Amir et al. |
| 6,714,536 B1 | 3/2004 | Dowling |
| 6,715,145 B1 | 3/2004 | Bowman-Amuah |
| 6,718,380 B1 | 4/2004 | Mohaban et al. |
| 6,718,535 B1 | 4/2004 | Underwood |
| 6,721,713 B1 | 4/2004 | Guheen et al. |
| 6,721,794 B2 | 4/2004 | Taylor et al. |
| 6,728,265 B1 | 4/2004 | Yavatkar et al. |
| 6,728,704 B2 | 4/2004 | Mao et al. |
| 6,735,218 B2 | 5/2004 | Chang et al. |
| 6,738,357 B1 | 5/2004 | Richter et al. |
| 6,738,790 B1 | 5/2004 | Klein et al. |
| 6,742,015 B1 | 5/2004 | Bowman-Amuah |
| 6,742,035 B1 | 5/2004 | Zayas et al. |
| 6,742,045 B1 | 5/2004 | Albert et al. |
| 6,744,776 B1 | 6/2004 | Kalkunte et al. |
| 6,745,360 B1 | 6/2004 | Srinivas et al. |
| 6,748,420 B1 | 6/2004 | Quatrano et al. |
| 6,751,453 B2 | 6/2004 | Schemers et al. |
| 6,751,663 B1 | 6/2004 | Farrell et al. |
| 6,751,673 B2 | 6/2004 | Shaw |
| 6,754,215 B1 | 6/2004 | Arikawa et al. |
| 6,754,228 B1 | 6/2004 | Ludwig |
| 6,754,699 B2 | 6/2004 | Swildens et al. |
| 6,757,706 B1 | 6/2004 | Dong et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,778,092 B2 | 8/2004 | Braune |
| 6,779,039 B1 | 8/2004 | Bommareddy et al. |
| 6,781,986 B1 | 8/2004 | Sabaa et al. |
| 6,782,450 B2 | 8/2004 | Arnott et al. |
| 6,785,236 B1 | 8/2004 | Lo et al. |
| 6,788,682 B1 | 9/2004 | Kimmitt |
| 6,789,154 B1 | 9/2004 | Lee et al. |
| 6,792,615 B1 | 9/2004 | Rowe et al. |
| 6,795,860 B1 | 9/2004 | Shah |
| 6,798,777 B1 | 9/2004 | Ferguson et al. |
| 6,799,221 B1 | 9/2004 | Kenner et al. |
| 6,801,499 B1 | 10/2004 | Anandakumar et al. |
| 6,801,960 B1 | 10/2004 | Ericson et al. |
| 6,804,542 B1 | 10/2004 | Haartsen |
| 6,807,648 B1 | 10/2004 | Cansever et al. |
| 6,816,901 B1 | 11/2004 | Sitaraman et al. |
| 6,816,963 B1 | 11/2004 | Krithivas et al. |
| 6,816,977 B2 | 11/2004 | Brakmo et al. |
| 6,820,133 B1 | 11/2004 | Grove et al. |
| 6,826,613 B1 | 11/2004 | Wang et al. |
| 6,826,616 B2 | 11/2004 | Larson et al. |
| 6,826,698 B1 | 11/2004 | Minkin et al. |
| 6,829,238 B2 | 12/2004 | Tokuyo et al. |
| 6,834,297 B1 | 12/2004 | Peiffer et al. |
| 6,834,310 B2 | 12/2004 | Munger et al. |
| 6,839,759 B2 | 1/2005 | Larson et al. |
| 6,839,761 B2 | 1/2005 | Kadyk et al. |

(56) References Cited

U.S. PATENT DOCUMENTS

| | | |
|---|---|---|
| 6,842,906 B1 | 1/2005 | Bowman-Amuah |
| 6,847,892 B2 | 1/2005 | Zhou et al. |
| 6,847,959 B1 | 1/2005 | Arrouye et al. |
| 6,847,970 B2 | 1/2005 | Keller et al. |
| 6,850,252 B1 | 2/2005 | Hoffberg |
| 6,850,491 B1 | 2/2005 | Firoiu et al. |
| 6,850,997 B1 | 2/2005 | Rooney et al. |
| 6,856,651 B2 | 2/2005 | Singh |
| 6,857,009 B1 | 2/2005 | Ferreria |
| 6,859,776 B1 | 2/2005 | Cohen et al. |
| 6,862,282 B1 | 3/2005 | Oden |
| 6,865,593 B1 | 3/2005 | Reshef et al. |
| 6,868,082 B1 | 3/2005 | Allen, Jr. et al. |
| 6,868,439 B2 | 3/2005 | Basu et al. |
| 6,868,447 B1 | 3/2005 | Slaughter et al. |
| 6,871,221 B1 | 3/2005 | Styles |
| 6,871,245 B2 | 3/2005 | Bradley |
| 6,876,629 B2 | 4/2005 | Beshai et al. |
| 6,876,654 B1 | 4/2005 | Hegde |
| 6,877,043 B2 | 4/2005 | Mallory et al. |
| 6,880,017 B1 | 4/2005 | Marce et al. |
| 6,880,086 B2 | 4/2005 | Kidder et al. |
| 6,882,624 B1 | 4/2005 | Ma |
| 6,882,634 B2 | 4/2005 | Bagchi et al. |
| 6,883,137 B1 | 4/2005 | Girardot et al. |
| 6,888,836 B1 | 5/2005 | Cherkasova |
| 6,888,844 B2 | 5/2005 | Mallory et al. |
| 6,888,927 B1 | 5/2005 | Cruickshank et al. |
| 6,889,249 B2 | 5/2005 | Miloushev et al. |
| 6,891,799 B1 | 5/2005 | Hagai et al. |
| 6,891,830 B2 | 5/2005 | Curtis |
| 6,891,881 B2 | 5/2005 | Trachewsky et al. |
| 6,898,204 B2 | 5/2005 | Trachewsky et al. |
| 6,901,072 B1 | 5/2005 | Wong |
| 6,901,075 B1 | 5/2005 | Baron |
| 6,904,040 B2 | 6/2005 | Salapura et al. |
| 6,907,473 B2 | 6/2005 | Schmidt et al. |
| 6,907,546 B1 | 6/2005 | Haswell et al. |
| 6,914,881 B1 | 7/2005 | Mansfield et al. |
| 6,914,886 B2 | 7/2005 | Peles et al. |
| 6,915,477 B2 | 7/2005 | Gollamudi et al. |
| 6,920,148 B1 | 7/2005 | Johnson et al. |
| 6,922,688 B1 | 7/2005 | Frey, Jr. |
| 6,928,082 B2 | 8/2005 | Liu et al. |
| 6,928,473 B1 | 8/2005 | Sundaram et al. |
| 6,928,518 B2 | 8/2005 | Talagala |
| 6,934,288 B2 | 8/2005 | Dempo |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,954,800 B2 | 10/2005 | Mallory |
| 6,954,801 B1 | 10/2005 | Housel |
| 6,957,186 B1 | 10/2005 | Guheen et al. |
| 6,957,272 B2 | 10/2005 | Tallegas et al. |
| 6,959,002 B2 | 10/2005 | Wynne et al. |
| 6,959,373 B2 | 10/2005 | Testardi |
| 6,959,394 B1 | 10/2005 | Brickell et al. |
| 6,961,815 B2 | 11/2005 | Kistler et al. |
| 6,970,475 B1 | 11/2005 | Fraser et al. |
| 6,970,552 B1 | 11/2005 | Hahn et al. |
| 6,970,924 B1 | 11/2005 | Chu et al. |
| 6,973,097 B1 | 12/2005 | Donzis et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,975,655 B2 | 12/2005 | Fischer et al. |
| 6,980,543 B1 | 12/2005 | Kastenholz et al. |
| 6,981,047 B2 | 12/2005 | Hanson et al. |
| 6,981,087 B1 | 12/2005 | Heitkamp et al. |
| 6,981,143 B2 | 12/2005 | Mullen et al. |
| 6,981,180 B1 | 12/2005 | Bailey et al. |
| 6,982,963 B2 | 1/2006 | Asahina |
| 6,985,936 B2 | 1/2006 | Agarwalla et al. |
| 6,985,956 B2 | 1/2006 | Luke et al. |
| 6,986,015 B2 | 1/2006 | Testardi |
| 6,986,040 B1 | 1/2006 | Kramer et al. |
| 6,987,763 B2 | 1/2006 | Rochberger et al. |
| 6,988,236 B2 | 1/2006 | Ptasinski et al. |
| 6,990,070 B1 | 1/2006 | Aweya et al. |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,993,101 B2 | 1/2006 | Trachewsky et al. |
| 6,996,841 B2 | 2/2006 | Kadyk et al. |
| 6,999,419 B2 | 2/2006 | Ise et al. |
| 6,999,912 B2 | 2/2006 | Loisey et al. |
| 7,000,031 B2 | 2/2006 | Fischer et al. |
| 7,003,533 B2 | 2/2006 | Noguchi et al. |
| 7,003,564 B2 | 2/2006 | Greuel et al. |
| 7,003,777 B2 | 2/2006 | Hines |
| 7,006,502 B2 | 2/2006 | Lin |
| 7,006,981 B2 | 2/2006 | Rose et al. |
| 7,007,089 B2 | 2/2006 | Freedman |
| 7,007,092 B2 | 2/2006 | Peiffer |
| 7,010,553 B2 | 3/2006 | Chen et al. |
| 7,010,615 B1 | 3/2006 | Tezuka et al. |
| 7,013,379 B1 | 3/2006 | Testardi |
| 7,016,367 B1 | 3/2006 | Dyckerhoff et al. |
| 7,016,973 B1 | 3/2006 | Sibal et al. |
| 7,020,644 B2 | 3/2006 | Jameson |
| 7,020,669 B2 | 3/2006 | McCann et al. |
| 7,020,713 B1 | 3/2006 | Shah et al. |
| 7,020,714 B2 | 3/2006 | Kalyanaraman et al. |
| 7,020,719 B1 | 3/2006 | Grove et al. |
| 7,023,807 B2 | 4/2006 | Michels et al. |
| 7,023,974 B1 | 4/2006 | Brannam et al. |
| 7,023,979 B1 | 4/2006 | Wu et al. |
| 7,024,427 B2 | 4/2006 | Bobbitt et al. |
| 7,025,209 B2 | 4/2006 | Hawkins |
| 7,027,975 B1 | 4/2006 | Pazandak et al. |
| 7,028,083 B2 | 4/2006 | Levine et al. |
| 7,031,315 B2 | 4/2006 | Tanaka |
| 7,032,153 B1 | 4/2006 | Zhang et al. |
| 7,035,212 B1 | 4/2006 | Mittal et al. |
| 7,035,285 B2 | 4/2006 | Holloway et al. |
| 7,035,914 B1 | 4/2006 | Payne et al. |
| 7,039,061 B2 | 5/2006 | Connor et al. |
| 7,039,828 B1 | 5/2006 | Scott |
| 7,043,225 B1 | 5/2006 | Patel et al. |
| 7,050,396 B1 | 5/2006 | Cohen et al. |
| 7,051,112 B2 | 5/2006 | Dawson |
| 7,054,998 B2 | 5/2006 | Arnott et al. |
| 7,055,010 B2 | 5/2006 | Lin et al. |
| 7,055,028 B2 | 5/2006 | Peiffer et al. |
| 7,058,633 B1 | 6/2006 | Gnagy et al. |
| 7,062,645 B2 | 6/2006 | Kroening |
| 7,065,482 B2 | 6/2006 | Shorey et al. |
| 7,068,641 B1 | 6/2006 | Allan et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,092,502 B2 | 8/2006 | Mohn et al. |
| 7,100,195 B1 | 8/2006 | Underwood |
| 7,103,068 B1 | 9/2006 | Gardner et al. |
| 7,111,115 B2 | 9/2006 | Peters et al. |
| 7,113,962 B1 | 9/2006 | Kee et al. |
| 7,113,993 B1 | 9/2006 | Cappiello et al. |
| 7,113,996 B2 | 9/2006 | Kronenberg |
| 7,116,894 B1 | 10/2006 | Chatterton |
| 7,120,728 B2 | 10/2006 | Krakirian et al. |
| 7,120,746 B2 | 10/2006 | Campbell et al. |
| 7,123,613 B1 | 10/2006 | Chawla et al. |
| 7,124,101 B1 | 10/2006 | Mikurak |
| 7,126,913 B1 | 10/2006 | Patel et al. |
| 7,127,556 B2 | 10/2006 | Blumenau et al. |
| 7,130,807 B1 | 10/2006 | Mikurak |

(56) References Cited

U.S. PATENT DOCUMENTS

| | | |
|---|---|---|
| 7,133,863 B2 | 11/2006 | Teng et al. |
| 7,133,944 B2 | 11/2006 | Song et al. |
| 7,133,967 B2 | 11/2006 | Fujie et al. |
| 7,136,645 B2 | 11/2006 | Hanson et al. |
| 7,139,792 B1 | 11/2006 | Mishra et al. |
| 7,143,146 B2 | 11/2006 | Nakatani et al. |
| 7,143,153 B1 | 11/2006 | Black et al. |
| 7,146,524 B2 | 12/2006 | Patel et al. |
| 7,149,698 B2 | 12/2006 | Guheen et al. |
| 7,150,017 B1 | 12/2006 | Vogl et al. |
| 7,152,184 B2 | 12/2006 | Maeda et al. |
| 7,155,466 B2 | 12/2006 | Rodriguez et al. |
| 7,161,904 B2 | 1/2007 | Hussain et al. |
| 7,165,041 B1 | 1/2007 | Guheen et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,174,126 B2 | 2/2007 | McElhatten et al. |
| 7,174,493 B2 | 2/2007 | Matsumoto et al. |
| 7,181,523 B2 | 2/2007 | Sim |
| 7,185,359 B2 | 2/2007 | Schmidt et al. |
| 7,188,180 B2 | 3/2007 | Larson et al. |
| 7,191,163 B2 | 3/2007 | Herrera et al. |
| 7,194,579 B2 | 3/2007 | Robinson et al. |
| 7,197,234 B1 | 3/2007 | Chatterton |
| 7,197,615 B2 | 3/2007 | Arakawa et al. |
| 7,197,751 B2 | 3/2007 | Fedotov et al. |
| 7,200,153 B2 | 4/2007 | Feuerstraeter et al. |
| 7,206,805 B1 | 4/2007 | McLaughlin, Jr. |
| 7,206,811 B2 | 4/2007 | Skurikhin et al. |
| 7,209,437 B1 | 4/2007 | Hodgkinson et al. |
| 7,219,127 B2 | 5/2007 | Huck et al. |
| 7,219,260 B1 | 5/2007 | de Forest et al. |
| 7,222,305 B2 | 5/2007 | Teplov et al. |
| 7,225,244 B2 | 5/2007 | Reynolds et al. |
| 7,227,872 B1 | 6/2007 | Biswas et al. |
| 7,228,359 B1 | 6/2007 | Monteiro |
| 7,228,422 B2 | 6/2007 | Morioka et al. |
| 7,231,571 B2 | 6/2007 | Buckely, Jr. |
| 7,234,074 B2 | 6/2007 | Cohn et al. |
| 7,236,491 B2 | 6/2007 | Tsao et al. |
| 7,237,076 B2 | 6/2007 | Nakano et al. |
| 7,240,100 B1 | 7/2007 | Wein et al. |
| 7,243,089 B2 | 7/2007 | Becker-Szendy et al. |
| 7,243,094 B2 | 7/2007 | Tabellion et al. |
| 7,257,633 B2 | 8/2007 | Masputra et al. |
| 7,260,840 B2 | 8/2007 | Swander et al. |
| 7,263,610 B2 | 8/2007 | Parker et al. |
| 7,266,773 B2 | 9/2007 | Dorwart |
| 7,269,168 B2 | 9/2007 | Roy et al. |
| 7,269,582 B2 | 9/2007 | Winter et al. |
| 7,272,613 B2 | 9/2007 | Sim et al. |
| 7,280,536 B2 | 10/2007 | Testardi |
| 7,280,547 B2 | 10/2007 | Featherston et al. |
| 7,283,470 B1 | 10/2007 | Sindhu et al. |
| 7,284,150 B2 | 10/2007 | Ma et al. |
| 7,286,566 B1 | 10/2007 | Parruck et al. |
| 7,287,082 B1 | 10/2007 | O'Toole, Jr. |
| 7,292,541 B1 | 11/2007 | CS |
| 7,293,097 B2 | 11/2007 | Borr |
| 7,293,099 B1 | 11/2007 | Kalajan |
| 7,293,133 B1 | 11/2007 | Colgrove et al. |
| 7,295,827 B2 | 11/2007 | Liu et al. |
| 7,296,263 B1 | 11/2007 | Jacob |
| 7,299,250 B2 | 11/2007 | Douceur et al. |
| 7,308,475 B1 | 12/2007 | Pruitt et al. |
| 7,308,703 B2 | 12/2007 | Wright et al. |
| 7,308,709 B1 | 12/2007 | Brezak et al. |
| 7,310,336 B2 | 12/2007 | Malkamaki |
| 7,310,339 B1 | 12/2007 | Powers et al. |
| 7,318,100 B2 | 1/2008 | Demmer et al. |
| 7,319,696 B2 | 1/2008 | Inoue et al. |
| 7,321,926 B1 | 1/2008 | Zhang et al. |
| 7,321,936 B2 | 1/2008 | Zimmerman et al. |
| 7,324,533 B1 | 1/2008 | DeLiberato et al. |
| 7,330,486 B2 | 2/2008 | Ko et al. |
| 7,333,999 B1 | 2/2008 | Njemanze |
| 7,340,571 B2 | 3/2008 | Saze |
| 7,340,572 B2 | 3/2008 | Cochran |
| 7,343,398 B1 | 3/2008 | Lownsbrough |
| 7,343,413 B2 | 3/2008 | Gilde et al. |
| 7,346,664 B2 | 3/2008 | Wong et al. |
| 7,349,391 B2 | 3/2008 | Ben-Dor et al. |
| 7,352,702 B2 | 4/2008 | Rosier |
| 7,360,237 B2 | 4/2008 | Engle et al. |
| 7,373,345 B2 | 5/2008 | Carpentier et al. |
| 7,373,438 B1 | 5/2008 | DeBergalis et al. |
| 7,373,520 B1 | 5/2008 | Borthakur et al. |
| 7,383,288 B2 | 6/2008 | Miloushev et al. |
| 7,383,463 B2 | 6/2008 | Hayden et al. |
| 7,383,570 B2 | 6/2008 | Pinkas et al. |
| 7,398,552 B2 | 7/2008 | Pardee et al. |
| 7,401,220 B2 | 7/2008 | Bolosky et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,418,439 B2 | 8/2008 | Wong |
| 7,433,962 B2 | 10/2008 | Janssen et al. |
| 7,437,358 B2 | 10/2008 | Arrouye et al. |
| 7,440,982 B2 | 10/2008 | Lu et al. |
| 7,454,480 B2 | 11/2008 | Labio et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,490,162 B1 | 2/2009 | Masters |
| 7,499,542 B2 | 3/2009 | Vaudenay et al. |
| 7,500,243 B2 | 3/2009 | Huetsch et al. |
| 7,500,269 B2 | 3/2009 | Huotari et al. |
| 7,502,860 B1 | 3/2009 | Champagne |
| 7,505,795 B1 | 3/2009 | Lim et al. |
| 7,509,322 B2 | 3/2009 | Miloushev et al. |
| 7,512,673 B2 | 3/2009 | Miloushev et al. |
| 7,516,492 B1 | 4/2009 | Nisbet et al. |
| 7,519,813 B1 | 4/2009 | Cox et al. |
| 7,522,581 B2 | 4/2009 | Acharya et al. |
| 7,526,541 B2 | 4/2009 | Roese et al. |
| 7,536,472 B2 | 5/2009 | O'Neal |
| 7,536,473 B2 | 5/2009 | Ajanovic et al. |
| 7,539,130 B2 | 5/2009 | Le et al. |
| 7,542,472 B1 | 6/2009 | Gerendai et al. |
| 7,552,126 B2 | 6/2009 | Chen et al. |
| 7,555,608 B2 | 6/2009 | Naik et al. |
| 7,558,197 B1 | 7/2009 | Sindhu et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,577,723 B2 | 8/2009 | Matsuda et al. |
| 7,580,971 B1 | 8/2009 | Gollapudi et al. |
| 7,587,471 B2 | 9/2009 | Yasuda et al. |
| 7,590,732 B2 | 9/2009 | Rune |
| 7,590,747 B2 | 9/2009 | Coates et al. |
| 7,599,941 B2 | 10/2009 | Bahar et al. |
| 7,609,640 B2 | 10/2009 | Ahuja et al. |
| 7,610,307 B2 | 10/2009 | Havewala et al. |
| 7,610,390 B2 | 10/2009 | Yared et al. |
| 7,616,638 B2 | 11/2009 | Samuels et al. |
| 7,624,109 B2 | 11/2009 | Testardi |
| 7,624,424 B2 | 11/2009 | Morita et al. |
| 7,639,883 B2 | 12/2009 | Gill |
| 7,640,347 B1 | 12/2009 | Sloat et al. |
| 7,644,109 B2 | 1/2010 | Manley et al. |
| 7,644,137 B2 | 1/2010 | Bozak et al. |
| 7,653,699 B1 | 1/2010 | Colgrove et al. |
| 7,656,788 B2 | 2/2010 | Ma et al. |
| 7,656,799 B2 | 2/2010 | Samuels et al. |
| 7,664,026 B2 | 2/2010 | Huang et al. |
| 7,668,166 B1 | 2/2010 | Rekhter et al. |
| 7,673,074 B1 | 3/2010 | Sebastian et al. |
| 7,680,836 B2 | 3/2010 | Anderson et al. |
| 7,680,915 B2 | 3/2010 | Still et al. |
| 7,684,423 B2 | 3/2010 | Tripathi et al. |

(56) References Cited

U.S. PATENT DOCUMENTS

| | | |
|---|---|---|
| 7,685,126 B2 | 3/2010 | Patel et al. |
| 7,685,177 B1 | 3/2010 | Hagerstrom et al. |
| 7,689,596 B2 | 3/2010 | Tsunoda |
| 7,689,710 B2 | 3/2010 | Tang et al. |
| 7,694,082 B2 | 4/2010 | Golding et al. |
| 7,698,453 B2 | 4/2010 | Samuels et al. |
| 7,698,458 B1 | 4/2010 | Liu et al. |
| 7,706,261 B2 | 4/2010 | Sun et al. |
| 7,711,771 B2 | 5/2010 | Kirnos |
| 7,724,657 B2 | 5/2010 | Rao et al. |
| 7,725,093 B2 | 5/2010 | Sengupta et al. |
| 7,725,657 B2 | 5/2010 | Hasenplaugh et al. |
| 7,725,763 B2 | 5/2010 | Vertes et al. |
| 7,734,603 B1 | 6/2010 | McManis |
| 7,739,540 B2 | 6/2010 | Akutsu et al. |
| 7,743,031 B1 | 6/2010 | Cameron et al. |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,769,860 B1 | 8/2010 | Assadzadeh |
| 7,778,187 B2 | 8/2010 | Chaturvedi et al. |
| 7,788,335 B2 | 8/2010 | Miloushev et al. |
| 7,801,978 B1 | 9/2010 | Susai et al. |
| 7,805,470 B2 | 9/2010 | Armangau et al. |
| 7,808,913 B2 | 10/2010 | Ansari et al. |
| 7,809,691 B1 | 10/2010 | Karmarkar et al. |
| 7,818,299 B1 | 10/2010 | Federwisch et al. |
| 7,822,839 B1 | 10/2010 | Pruitt et al. |
| 7,822,939 B1 | 10/2010 | Veprinsky et al. |
| 7,831,639 B1 | 11/2010 | Panchbudhe et al. |
| 7,831,662 B2 | 11/2010 | Clark et al. |
| 7,849,112 B2 | 12/2010 | Mane et al. |
| 7,853,958 B2 | 12/2010 | Mathew et al. |
| 7,856,026 B1 | 12/2010 | Finan et al. |
| 7,861,085 B1 | 12/2010 | Case et al. |
| 7,870,154 B2 | 1/2011 | Shitomi et al. |
| 7,876,677 B2 | 1/2011 | Cheshire |
| 7,877,511 B1 | 1/2011 | Berger et al. |
| 7,885,970 B2 | 2/2011 | Lacapra |
| 7,886,218 B2 | 2/2011 | Watson |
| 7,895,653 B2 | 2/2011 | Calo et al. |
| 7,900,002 B2 | 3/2011 | Lyon |
| 7,903,554 B1 | 3/2011 | Manur et al. |
| 7,904,466 B1 | 3/2011 | Valencia et al. |
| 7,908,245 B2 | 3/2011 | Nakano et al. |
| 7,908,314 B2 | 3/2011 | Yamaguchi et al. |
| 7,913,053 B1 | 3/2011 | Newland |
| 7,924,881 B2 | 4/2011 | Frank et al. |
| 7,925,908 B2 | 4/2011 | Kim |
| 7,930,365 B2 | 4/2011 | Dixit et al. |
| 7,933,946 B2 | 4/2011 | Livshits et al. |
| 7,937,421 B2 | 5/2011 | Mikesell et al. |
| 7,945,908 B1 | 5/2011 | Waldspurger et al. |
| 7,953,085 B2 | 5/2011 | Chang et al. |
| 7,953,701 B2 | 5/2011 | Okitsu et al. |
| 7,958,222 B1 | 6/2011 | Pruitt et al. |
| 7,958,347 B1 | 6/2011 | Ferguson |
| 7,958,435 B2 | 6/2011 | Kure et al. |
| 7,984,108 B2 | 7/2011 | Landis et al. |
| 7,984,141 B2 | 7/2011 | Gupta et al. |
| 7,984,500 B1 | 7/2011 | Khanna et al. |
| 8,005,953 B2 | 8/2011 | Miloushev et al. |
| 8,015,157 B2 | 9/2011 | Kamei et al. |
| 8,015,474 B2 | 9/2011 | Izzat et al. |
| 8,024,443 B1 | 9/2011 | Jacob |
| 8,037,528 B2 | 10/2011 | Williams et al. |
| 8,041,022 B1 | 10/2011 | Andreasen et al. |
| 8,046,547 B1 | 10/2011 | Chatterjee et al. |
| 8,055,724 B2 | 11/2011 | Amegadzie et al. |
| 8,060,017 B2 | 11/2011 | Schlicht et al. |
| 8,064,342 B2 | 11/2011 | Badger |
| 8,069,225 B2 | 11/2011 | McCanne et al. |
| 8,074,107 B2 | 12/2011 | Sivasubramanian et al. |
| 8,099,758 B2 | 1/2012 | Schaefer et al. |
| 8,103,622 B1 | 1/2012 | Karinta |
| 8,103,781 B1 | 1/2012 | Wu et al. |
| 8,112,392 B1 | 2/2012 | Bunnell et al. |
| 8,117,244 B2 | 2/2012 | Marinov et al. |
| 8,130,650 B2 | 3/2012 | Allen, Jr. et al. |
| 8,149,819 B2 | 4/2012 | Kobayashi et al. |
| 8,155,128 B2 | 4/2012 | Balyan et al. |
| 8,171,124 B2 | 5/2012 | Kondamuru |
| 8,189,567 B2 | 5/2012 | Kavanagh et al. |
| 8,190,769 B1 | 5/2012 | Shukla et al. |
| 8,199,757 B2 | 6/2012 | Pani et al. |
| 8,205,246 B2 | 6/2012 | Shatzkamer et al. |
| 8,209,403 B2 | 6/2012 | Szabo et al. |
| 8,239,954 B2 | 8/2012 | Wobber et al. |
| 8,271,620 B2 | 9/2012 | Witchey |
| 8,271,751 B2 | 9/2012 | Hinrichs, Jr. |
| 8,274,895 B2 | 9/2012 | Rahman et al. |
| 8,306,948 B2 | 11/2012 | Chou et al. |
| 8,321,908 B2 | 11/2012 | Gai et al. |
| 8,326,798 B1 | 12/2012 | Driscoll et al. |
| 8,351,333 B2 | 1/2013 | Rao et al. |
| 8,380,854 B2 | 2/2013 | Szabo |
| 8,396,836 B1 | 3/2013 | Ferguson et al. |
| 8,417,746 B1 | 4/2013 | Gillett, Jr. et al. |
| 8,417,817 B1 | 4/2013 | Jacobs |
| 8,605,583 B2 | 4/2013 | Cutler |
| 8,447,871 B1 | 5/2013 | Szabo |
| 8,447,970 B2 | 5/2013 | Klein et al. |
| 8,452,876 B1 | 5/2013 | Williams et al. |
| 8,463,850 B1 | 6/2013 | McCann |
| 8,464,265 B2 | 6/2013 | Worley |
| 8,468,247 B1 | 6/2013 | Richardson et al. |
| 8,468,267 B2 | 6/2013 | Yigang |
| 8,468,542 B2 | 6/2013 | Jacobson et al. |
| 8,484,348 B2 | 7/2013 | Subramanian et al. |
| 8,498,951 B1 | 7/2013 | Baluja et al. |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,539,224 B2 | 9/2013 | Henderson et al. |
| 8,566,474 B2 | 10/2013 | Kanode et al. |
| 8,572,007 B1 | 10/2013 | Manadhata et al. |
| 8,576,283 B1 | 11/2013 | Foster et al. |
| 8,578,050 B2 | 11/2013 | Craig et al. |
| 8,595,547 B1 | 11/2013 | Sivasubramanian et al. |
| 8,601,000 B1 | 12/2013 | Stefani et al. |
| 8,606,921 B2 | 12/2013 | Vasquez et al. |
| 8,615,022 B2 | 12/2013 | Harrison et al. |
| 8,620,879 B2 | 12/2013 | Cairns |
| 8,646,067 B2 | 2/2014 | Agarwal et al. |
| 8,665,868 B2 | 3/2014 | Kay |
| 8,665,969 B2 | 3/2014 | Kay |
| 8,676,753 B2 | 3/2014 | Sivasubramanian et al. |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,738,791 B1 * | 5/2014 | Martini .......... H04L 41/50 709/225 |
| 8,745,266 B2 | 6/2014 | Agarwal et al. |
| 8,763,015 B1 | 6/2014 | Caccavale |
| 8,788,665 B2 | 7/2014 | Gilde et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,832,790 B1 | 9/2014 | Villa et al. |
| 8,838,817 B1 | 9/2014 | Biswas |
| 8,873,753 B2 | 10/2014 | Parker |
| 8,875,274 B2 | 10/2014 | Montemurro et al. |
| 8,879,431 B2 | 11/2014 | Ridel et al. |
| 8,886,981 B1 | 11/2014 | Baumann et al. |
| 8,908,545 B1 | 12/2014 | Chen et al. |
| 8,954,080 B2 | 2/2015 | Janakiriman et al. |
| 8,959,215 B2 | 2/2015 | Koponen et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |

(56) References Cited

U.S. PATENT DOCUMENTS

| | | |
|---|---|---|
| 9,083,760 B1 | 7/2015 | Hughes et al. |
| 9,143,451 B2 | 9/2015 | Amdahl et al. |
| 9,172,753 B1 | 10/2015 | Jiang |
| 9,244,843 B1 | 1/2016 | Michels et al. |
| 9,246,819 B1 | 1/2016 | Thirasuttakorn |
| 9,258,742 B1 | 2/2016 | Piangiani et al. |
| 9,497,614 B1 | 11/2016 | Ridel et al. |
| 2001/0007137 A1 | 7/2001 | Suumaki et al. |
| 2001/0007560 A1 | 7/2001 | Masuda et al. |
| 2001/0009554 A1 | 7/2001 | Katseff et al. |
| 2001/0023442 A1 | 9/2001 | Masters |
| 2001/0030970 A1 | 10/2001 | Wiryaman et al. |
| 2001/0047293 A1 | 11/2001 | Waller et al. |
| 2001/0049717 A1 | 12/2001 | Freeman et al. |
| 2002/0006790 A1 | 1/2002 | Blumenstock et al. |
| 2002/0010757 A1 | 1/2002 | Granik et al. |
| 2002/0010783 A1 | 1/2002 | Primak et al. |
| 2002/0010866 A1 | 1/2002 | McCullough et al. |
| 2002/0012352 A1 | 1/2002 | Hansson et al. |
| 2002/0012382 A1 | 1/2002 | Schilling |
| 2002/0016827 A1 | 2/2002 | McCabe et al. |
| 2002/0016851 A1 | 2/2002 | Border |
| 2002/0032489 A1 | 3/2002 | Tynan et al. |
| 2002/0032777 A1 | 3/2002 | Kawata et al. |
| 2002/0034173 A1 | 3/2002 | Border et al. |
| 2002/0035537 A1 | 3/2002 | Waller et al. |
| 2002/0035683 A1 | 3/2002 | Kaashoek et al. |
| 2002/0038360 A1 | 3/2002 | Andrews et al. |
| 2002/0041592 A1 | 4/2002 | Van Der Zee et al. |
| 2002/0046291 A1 | 4/2002 | O'Callaghan et al. |
| 2002/0049608 A1 | 4/2002 | Hartsell et al. |
| 2002/0049842 A1 | 4/2002 | Huetsch et al. |
| 2002/0052928 A1* | 5/2002 | Stern ............... G06F 17/30864 709/218 |
| 2002/0052931 A1 | 5/2002 | Peiffer et al. |
| 2002/0059263 A1 | 5/2002 | Shima et al. |
| 2002/0059428 A1 | 5/2002 | Susai et al. |
| 2002/0059622 A1 | 5/2002 | Grove et al. |
| 2002/0065848 A1 | 5/2002 | Walker et al. |
| 2002/0065864 A1 | 5/2002 | Hartsell et al. |
| 2002/0002688 A1 | 6/2002 | Gregg et al. |
| 2002/0071434 A1 | 6/2002 | Furukawa |
| 2002/0071436 A1 | 6/2002 | Border et al. |
| 2002/0071438 A1 | 6/2002 | Singh |
| 2002/0072048 A1 | 6/2002 | Slattery et al. |
| 2002/0073167 A1 | 6/2002 | Powell et al. |
| 2002/0080721 A1 | 6/2002 | Tobagi et al. |
| 2002/0083067 A1 | 6/2002 | Tamayo et al. |
| 2002/0083205 A1 | 6/2002 | Leon et al. |
| 2002/0085585 A1 | 7/2002 | Tzeng |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0089930 A1 | 7/2002 | Aceves et al. |
| 2002/0089972 A1 | 7/2002 | Chang et al. |
| 2002/0089977 A1 | 7/2002 | Chang et al. |
| 2002/0090006 A1 | 7/2002 | Chang et al. |
| 2002/0091884 A1 | 7/2002 | Chang et al. |
| 2002/0095400 A1 | 7/2002 | Johnson et al. |
| 2002/0095498 A1 | 7/2002 | Chanda et al. |
| 2002/0095511 A1 | 7/2002 | Walker |
| 2002/0097713 A1 | 7/2002 | Chang et al. |
| 2002/0098840 A1 | 7/2002 | Hanson et al. |
| 2002/0099829 A1 | 7/2002 | Richards et al. |
| 2002/0099842 A1 | 7/2002 | Jennings et al. |
| 2002/0099851 A1 | 7/2002 | Shah et al. |
| 2002/0101860 A1 | 8/2002 | Thornton et al. |
| 2002/0103823 A1 | 8/2002 | Jackson et al. |
| 2002/0105972 A1 | 8/2002 | Richter et al. |
| 2002/0106263 A1 | 8/2002 | Winker |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0112061 A1 | 8/2002 | Shih et al. |
| 2002/0112152 A1 | 8/2002 | VanHeyningen et al. |
| 2002/0115407 A1 | 8/2002 | Thompson et al. |
| 2002/0116452 A1 | 8/2002 | Johnson et al. |
| 2002/0120763 A1 | 8/2002 | Miloushev et al. |
| 2002/0138551 A1 | 9/2002 | Erickson |
| 2002/0138615 A1 | 9/2002 | Schmeling |
| 2002/0138618 A1 | 9/2002 | Szabo |
| 2002/0141339 A1 | 10/2002 | Konuma |
| 2002/0141418 A1 | 10/2002 | Ben-Dor et al. |
| 2002/0143819 A1 | 10/2002 | Han et al. |
| 2002/0143852 A1 | 10/2002 | Guo et al. |
| 2002/0143909 A1 | 10/2002 | Botz et al. |
| 2002/0147822 A1 | 10/2002 | Susai et al. |
| 2002/0150048 A1 | 10/2002 | Ha et al. |
| 2002/0150064 A1 | 10/2002 | Lucidarme |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0178410 A1 | 11/2002 | Haitsma et al. |
| 2002/0186661 A1 | 12/2002 | Santiago et al. |
| 2002/0188001 A1 | 12/2002 | Xu et al. |
| 2002/0188753 A1 | 12/2002 | Tang et al. |
| 2002/0191600 A1 | 12/2002 | Shah et al. |
| 2002/0191612 A1 | 12/2002 | Curtis |
| 2002/0194112 A1 | 12/2002 | DePinto et al. |
| 2002/0194317 A1 | 12/2002 | Kanada et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0002484 A1 | 1/2003 | Freedman |
| 2003/0005172 A1 | 1/2003 | Chessell |
| 2003/0009528 A1 | 1/2003 | Sharif et al. |
| 2003/0012382 A1 | 1/2003 | Ferchichi et al. |
| 2003/0014623 A1 | 1/2003 | Freed et al. |
| 2003/0014625 A1 | 1/2003 | Freed et al. |
| 2003/0014628 A1 | 1/2003 | Freed et al. |
| 2003/0018450 A1 | 1/2003 | Carley |
| 2003/0018585 A1 | 1/2003 | Butler et al. |
| 2003/0026241 A1 | 2/2003 | Ono et al. |
| 2003/0028514 A1 | 2/2003 | Lord et al. |
| 2003/0033308 A1 | 2/2003 | Patel et al. |
| 2003/0033520 A1 | 2/2003 | Pfeiffer et al. |
| 2003/0033535 A1 | 2/2003 | Fisher et al. |
| 2003/0034905 A1 | 2/2003 | Anton et al. |
| 2003/0035370 A1 | 2/2003 | Brustoloni |
| 2003/0035413 A1 | 2/2003 | Herle et al. |
| 2003/0037070 A1 | 2/2003 | Marston |
| 2003/0046291 A1 | 3/2003 | Fascenda |
| 2003/0051045 A1 | 3/2003 | Connor |
| 2003/0051046 A1 | 3/2003 | Connor |
| 2003/0055723 A1 | 3/2003 | English |
| 2003/0065653 A1 | 4/2003 | Overton et al. |
| 2003/0065762 A1 | 4/2003 | Stolorz et al. |
| 2003/0065951 A1 | 4/2003 | Igeta et al. |
| 2003/0065956 A1 | 4/2003 | Belapurkar et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0076224 A1 | 4/2003 | Braune |
| 2003/0086403 A1 | 5/2003 | Harris et al. |
| 2003/0086415 A1 | 5/2003 | Bernhard et al. |
| 2003/0093691 A1 | 5/2003 | Simon et al. |
| 2003/0103472 A1 | 6/2003 | Taylor et al. |
| 2003/0105807 A1 | 6/2003 | Thompson et al. |
| 2003/0105846 A1 | 6/2003 | Zhao et al. |
| 2003/0105977 A1 | 6/2003 | Brabson et al. |
| 2003/0105983 A1 | 6/2003 | Brakimo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0112809 A1 | 6/2003 | Bharali et al. |
| 2003/0115331 A1 | 6/2003 | Xie et al. |
| 2003/0117992 A1 | 6/2003 | Kim et al. |

(56) References Cited

U.S. PATENT DOCUMENTS

| | | |
|---|---|---|
| 2003/0118035 A1 | 6/2003 | Sharma et al. |
| 2003/0119556 A1 | 6/2003 | Khan et al. |
| 2003/0120802 A1 | 6/2003 | Kohno |
| 2003/0120811 A1 | 6/2003 | Hanson et al. |
| 2003/0120948 A1 | 6/2003 | Schmidt et al. |
| 2003/0123394 A1 | 7/2003 | Neale et al. |
| 2003/0123481 A1 | 7/2003 | Neale et al. |
| 2003/0128704 A1 | 7/2003 | Mizrachi et al. |
| 2003/0128708 A1 | 7/2003 | Inoue et al. |
| 2003/0130945 A1 | 7/2003 | Force |
| 2003/0131079 A1 | 7/2003 | Neale et al. |
| 2003/0131263 A1 | 7/2003 | Keane et al. |
| 2003/0139934 A1 | 7/2003 | Mandera |
| 2003/0140210 A1 | 7/2003 | Testardi |
| 2003/0143959 A1 | 7/2003 | Harris et al. |
| 2003/0145062 A1 | 7/2003 | Sharma et al. |
| 2003/0145233 A1 | 7/2003 | Poletto et al. |
| 2003/0149715 A1 | 8/2003 | Ruutu et al. |
| 2003/0156586 A1 | 8/2003 | Lee et al. |
| 2003/0159072 A1 | 8/2003 | Bellinger et al. |
| 2003/0163576 A1 | 8/2003 | Janssen et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0018993 A1 | 10/2003 | Terrell et al. |
| 2003/0187975 A1 | 10/2003 | Brown et al. |
| 2003/0188195 A1 | 10/2003 | Abdo et al. |
| 2003/0189936 A1 | 10/2003 | Terrell et al. |
| 2003/0191799 A1 | 10/2003 | Araujo et al. |
| 2003/0191812 A1 | 10/2003 | Agarwalla et al. |
| 2003/0193893 A1 | 10/2003 | Wen et al. |
| 2003/0195813 A1 | 10/2003 | Pallister et al. |
| 2003/0195962 A1 | 10/2003 | Kikuchi et al. |
| 2003/0200207 A1 | 10/2003 | Dickinson |
| 2003/0200284 A1 | 10/2003 | Philbrick et al. |
| 2003/0200290 A1 | 10/2003 | Zimmerman et al. |
| 2003/0202480 A1 | 10/2003 | Swami |
| 2003/0204635 A1 | 10/2003 | Ko et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0223361 A1 | 12/2003 | Hussain et al. |
| 2003/0225485 A1 | 12/2003 | Fritz et al. |
| 2003/0226038 A1 | 12/2003 | Raanan et al. |
| 2003/0229665 A1 | 12/2003 | Ryman |
| 2003/0229718 A1 | 12/2003 | Tock et al. |
| 2003/0233385 A1 | 12/2003 | Srinivasa et al. |
| 2003/0233581 A1 | 12/2003 | Reshef et al. |
| 2003/0235196 A1 | 12/2003 | Blachandran et al. |
| 2003/0236837 A1 | 12/2003 | Johnson et al. |
| 2003/0236887 A1 | 12/2003 | Kesselman et al. |
| 2003/0236919 A1 | 12/2003 | Johnson et al. |
| 2003/0236995 A1 | 12/2003 | Fretwell, Jr. |
| 2004/0001691 A1 | 1/2004 | Li et al. |
| 2004/0003266 A1 | 1/2004 | Moshir et al. |
| 2004/0003287 A1 | 1/2004 | Zissimopoulos et al. |
| 2004/0006575 A1 | 1/2004 | Visharam et al. |
| 2004/0006590 A1 | 1/2004 | Lucovsky et al. |
| 2004/0006591 A1 | 1/2004 | Matsui et al. |
| 2004/0006643 A1 | 1/2004 | Dolson et al. |
| 2004/0008693 A1 | 1/2004 | Grove et al. |
| 2004/0010654 A1 | 1/2004 | Yasuda et al. |
| 2004/0015591 A1 | 1/2004 | Wang |
| 2004/0015783 A1 | 1/2004 | Lennon et al. |
| 2004/0017825 A1 | 1/2004 | Stanwood et al. |
| 2004/0022263 A1 | 2/2004 | Zhao et al. |
| 2004/0028043 A1 | 2/2004 | Maveli et al. |
| 2004/0030627 A1 | 2/2004 | Sedukhin |
| 2004/0030740 A1 | 2/2004 | Stelting |
| 2004/0030857 A1 | 2/2004 | Krakirian et al. |
| 2004/0031058 A1 | 2/2004 | Reisman |
| 2004/0043758 A1 | 3/2004 | Sorvari et al. |
| 2004/0044705 A1 | 3/2004 | Stager et al. |
| 2004/0054748 A1 | 3/2004 | Ackaouy et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0078465 A1 | 4/2004 | Coates et al. |
| 2004/0085902 A1 | 5/2004 | Miller et al. |
| 2004/0093361 A1 | 5/2004 | Therrien et al. |
| 2004/0093474 A1 | 5/2004 | Lin et al. |
| 2004/0098595 A1 | 5/2004 | Aupperle et al. |
| 2004/0103283 A1 | 5/2004 | Hornak |
| 2004/0103438 A1 | 5/2004 | Yan et al. |
| 2004/0107360 A1 | 6/2004 | Herrmann et al. |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0127131 A1 | 7/2004 | Potnis |
| 2004/0133577 A1 | 7/2004 | Miloushev et al. |
| 2004/0133605 A1 | 7/2004 | Chang et al. |
| 2004/0133606 A1 | 7/2004 | Miloushev et al. |
| 2004/0136379 A1 | 7/2004 | Liao et al. |
| 2004/0138858 A1 | 7/2004 | Carley |
| 2004/0139355 A1 | 7/2004 | Axel et al. |
| 2004/0141525 A1 | 7/2004 | Bhushan et al. |
| 2004/0141185 A1 | 8/2004 | Akama |
| 2004/0151186 A1 | 8/2004 | Akama |
| 2004/0153479 A1 | 8/2004 | Mikesell et al. |
| 2004/0167967 A1 | 8/2004 | Bastian et al. |
| 2004/0174886 A1 | 9/2004 | Packer |
| 2004/0177165 A1 | 9/2004 | Masputra et al. |
| 2004/0192312 A1 | 9/2004 | Li et al. |
| 2004/0196785 A1 | 10/2004 | Janakiraman et al. |
| 2004/0199547 A1 | 10/2004 | Winter et al. |
| 2004/0199762 A1 | 10/2004 | Carlson et al. |
| 2004/0210663 A1 | 10/2004 | Phillips et al. |
| 2004/0213156 A1 | 10/2004 | Smallwood et al. |
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2004/0250032 A1 | 12/2004 | Ji et al. |
| 2004/0250124 A1 | 12/2004 | Chesla et al. |
| 2004/0254919 A1 | 12/2004 | Giuseppini |
| 2004/0255000 A1 | 12/2004 | Simionescu et al. |
| 2004/0258003 A1 | 12/2004 | Kokot et al. |
| 2004/0264377 A1 | 12/2004 | Kilkki et al. |
| 2004/0264433 A1 | 12/2004 | Melpignano |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0008017 A1 | 1/2005 | Datta et al. |
| 2005/0013280 A1 | 1/2005 | Buddhikot et al. |
| 2005/0021703 A1 | 1/2005 | Cherry et al. |
| 2005/0021736 A1 | 1/2005 | Carusi et al. |
| 2005/0021864 A1 | 1/2005 | Sherman et al. |
| 2005/0144186 A1 | 1/2005 | Hesselink et al. |
| 2005/0027841 A1 | 2/2005 | Rolfe |
| 2005/0027862 A1 | 2/2005 | Nguyen et al. |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0045556 A1 | 3/2005 | Kryzak |
| 2005/0050107 A1 | 3/2005 | Mane et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0071589 A1 | 3/2005 | Tross et al. |
| 2005/0074007 A1 | 4/2005 | Samuels et al. |
| 2005/0078171 A1 | 4/2005 | Firestone et al. |
| 2005/0078604 A1 | 4/2005 | Yim |
| 2005/0080876 A1 | 4/2005 | Peiffer et al. |
| 2005/0088966 A9 | 4/2005 | Stewart |
| 2005/0089004 A1 | 4/2005 | Casaccia et al. |
| 2005/0089010 A1 | 4/2005 | Rue et al. |
| 2005/0089049 A1 | 4/2005 | Chang et al. |
| 2005/0091214 A1 | 4/2005 | Probert et al. |

(56) References Cited

U.S. PATENT DOCUMENTS

| | | |
|---|---|---|
| 2005/0097358 A1 | 5/2005 | Yanovsky |
| 2005/0108575 A1 | 5/2005 | Yung |
| 2005/0111371 A1 | 5/2005 | Miura et al. |
| 2005/0114186 A1 | 5/2005 | Heinrich |
| 2005/0114701 A1 | 5/2005 | Atkins et al. |
| 2005/0117589 A1 | 6/2005 | Douady et al. |
| 2005/0120003 A1* | 6/2005 | Drury ............... G06F 17/30864 |
| 2005/0122942 A1 | 6/2005 | Rhee et al. |
| 2005/0122977 A1 | 6/2005 | Lieberman |
| 2005/0125688 A1 | 6/2005 | Ogawa |
| 2005/0135250 A1 | 6/2005 | Singh et al. |
| 2005/0135252 A1 | 6/2005 | Singh et al. |
| 2005/0141507 A1 | 6/2005 | Curtis |
| 2005/0149481 A1 | 7/2005 | Hesselink et al. |
| 2005/0152397 A1 | 7/2005 | Bai et al. |
| 2005/0154837 A1 | 7/2005 | Keohane et al. |
| 2005/0160161 A1 | 7/2005 | Barrett et al. |
| 2005/0160243 A1 | 7/2005 | Lubbers et al. |
| 2005/0165656 A1 | 7/2005 | Frederick et al. |
| 2005/0017494 A1 | 8/2005 | Legault et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0193245 A1 | 9/2005 | Hayden et al. |
| 2005/0195835 A1 | 9/2005 | Savage et al. |
| 2005/0198234 A1 | 9/2005 | Leib et al. |
| 2005/0198310 A1 | 9/2005 | Kim et al. |
| 2005/0198501 A1 | 9/2005 | Andreev et al. |
| 2005/0207619 A1 | 9/2005 | Lohmann |
| 2005/0213587 A1 | 9/2005 | Cho et al. |
| 2005/0220086 A1 | 10/2005 | Dowling |
| 2005/0223114 A1 | 10/2005 | Hanson et al. |
| 2005/0223115 A1 | 10/2005 | Hanson et al. |
| 2005/0229237 A1 | 10/2005 | Xie et al. |
| 2005/0232161 A1 | 10/2005 | Maufer et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0262238 A1 | 11/2005 | Reeves et al. |
| 2005/0265353 A1 | 12/2005 | Sengupta et al. |
| 2005/0273456 A1 | 12/2005 | Revanuru et al. |
| 2005/0288939 A1 | 12/2005 | Peled et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0039287 A1 | 2/2006 | Hasegawa et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0049340 A1 | 3/2006 | Haberer et al. |
| 2006/0059005 A1 | 3/2006 | Horn et al. |
| 2006/0059267 A1 | 3/2006 | Cugi et al. |
| 2006/0059400 A1 | 3/2006 | Clark et al. |
| 2006/0059484 A1 | 3/2006 | Selvaggi et al. |
| 2006/0064716 A1 | 3/2006 | Sull et al. |
| 2006/0067222 A1 | 3/2006 | Endoh |
| 2006/0074922 A1 | 4/2006 | Nishimura |
| 2006/0075475 A1 | 4/2006 | Boulos et al. |
| 2006/0077902 A1 | 4/2006 | Kannan et al. |
| 2006/0077986 A1 | 4/2006 | Rune |
| 2006/0080353 A1 | 4/2006 | Miloushev et al. |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0106882 A1 | 5/2006 | Douceur et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0112399 A1 | 5/2006 | Lessly |
| 2006/0113223 A1 | 6/2006 | Grimm et al. |
| 2006/0123062 A1 | 6/2006 | Bobbitt et al. |
| 2006/0123210 A1 | 6/2006 | Pritchett et al. |
| 2006/0126535 A1 | 6/2006 | Sherman |
| 2006/0126616 A1 | 6/2006 | Bhatia |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0167838 A1 | 7/2006 | Lacapra |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0179261 A1 | 8/2006 | Rajan |
| 2006/0182103 A1 | 8/2006 | Martini et al. |
| 2006/0184589 A1 | 8/2006 | Lees et al. |
| 2006/0184647 A1 | 8/2006 | Dixit et al. |
| 2006/0200470 A1 | 9/2006 | Lacapra et al. |
| 2006/0206931 A1 | 9/2006 | Dillaway et al. |
| 2006/0209669 A1 | 9/2006 | Nishio |
| 2006/0209853 A1 | 9/2006 | Hidaka et al. |
| 2006/0215556 A1 | 9/2006 | Wu et al. |
| 2006/0215684 A1 | 9/2006 | Capone |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0229861 A1 | 10/2006 | Tatsuoka et al. |
| 2006/0230148 A1 | 10/2006 | Forecast et al. |
| 2006/0230265 A1 | 10/2006 | Krishna |
| 2006/0233106 A1 | 10/2006 | Achlioptas et al. |
| 2006/0233178 A1 | 10/2006 | Lu et al. |
| 2006/0235998 A1 | 10/2006 | Stechler et al. |
| 2006/0242179 A1 | 10/2006 | Chen et al. |
| 2006/0242300 A1 | 10/2006 | Yumoto et al. |
| 2006/0259320 A1 | 11/2006 | LaSalle et al. |
| 2006/0259607 A1 | 11/2006 | O'Neal |
| 2006/0259949 A1 | 11/2006 | Schaefer et al. |
| 2006/0268692 A1 | 11/2006 | Wright et al. |
| 2006/0268704 A1 | 11/2006 | Ansari et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2006/0291483 A1 | 12/2006 | Sela |
| 2006/0294054 A1 | 12/2006 | Kudo et al. |
| 2006/0294164 A1 | 12/2006 | Armangau et al. |
| 2007/0005807 A1 | 1/2007 | Wong |
| 2007/0006293 A1 | 1/2007 | Balakrishnan et al. |
| 2007/0008883 A1 | 1/2007 | Kobayashi |
| 2007/0016613 A1 | 1/2007 | Foresti et al. |
| 2007/0016662 A1 | 1/2007 | Desai et al. |
| 2007/0016754 A1 | 1/2007 | Testardi |
| 2007/0019636 A1 | 1/2007 | Lau et al. |
| 2007/0019658 A1 | 1/2007 | Park et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0038994 A1 | 2/2007 | Davis et al. |
| 2007/0050843 A1 | 3/2007 | Manville et al. |
| 2007/0058670 A1 | 3/2007 | Konduru et al. |
| 2007/0060152 A1 | 3/2007 | Sakamoto |
| 2007/0061441 A1 | 3/2007 | Landis et al. |
| 2007/0064661 A1 | 3/2007 | Sood et al. |
| 2007/0067771 A1 | 3/2007 | Kulbak et al. |
| 2007/0079222 A1 | 4/2007 | Kure et al. |
| 2007/0083646 A1 | 4/2007 | Miller et al. |
| 2007/0086485 A1 | 4/2007 | Vega-Garcia et al. |
| 2007/0088702 A1 | 4/2007 | Fridella et al. |
| 2007/0088822 A1 | 4/2007 | Coile et al. |
| 2007/0106681 A1 | 5/2007 | Haot et al. |
| 2007/0106796 A1 | 5/2007 | Kudo et al. |
| 2007/0107048 A1 | 5/2007 | Halls et al. |

(56) References Cited

U.S. PATENT DOCUMENTS

| | | |
|---|---|---|
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0124584 A1 | 5/2007 | Gupta |
| 2007/0130255 A1 | 6/2007 | Wolovitz et al. |
| 2007/0136308 A1 | 6/2007 | Tsirigotis et al. |
| 2007/0147246 A1 | 6/2007 | Hurley et al. |
| 2007/0160063 A1 | 7/2007 | Mynam et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0174491 A1 | 7/2007 | Still et al. |
| 2007/0180314 A1 | 8/2007 | Kawashima et al. |
| 2007/0192329 A1 | 8/2007 | Croft et al. |
| 2007/0192543 A1 | 8/2007 | Naik et al. |
| 2007/0206621 A1 | 9/2007 | Plamondon et al. |
| 2007/0208748 A1 | 9/2007 | Li |
| 2007/0209075 A1 | 9/2007 | Coffman |
| 2007/0220598 A1 | 9/2007 | Salowey et al. |
| 2007/0223379 A1 | 9/2007 | Sivakumar et al. |
| 2007/0233809 A1 | 10/2007 | Brownell et al. |
| 2007/0233826 A1 | 10/2007 | Tindal et al. |
| 2007/0239944 A1 | 10/2007 | Rupanagunta et al. |
| 2007/0250560 A1 | 10/2007 | Wein et al. |
| 2007/0258451 A1 | 11/2007 | Bouat |
| 2007/0260830 A1 | 11/2007 | Faibish et al. |
| 2007/0260970 A1 | 11/2007 | Dorwart |
| 2007/0291778 A1 | 12/2007 | Huang et al. |
| 2007/0297410 A1 | 12/2007 | Yoon et al. |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khendouri et al. |
| 2008/0010563 A1 | 1/2008 | Nishimura |
| 2008/0021597 A1 | 1/2008 | Merte et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0040509 A1 | 2/2008 | Werb |
| 2008/0046432 A1 | 2/2008 | Anderson et al. |
| 2008/0070575 A1 | 3/2008 | Claussen et al. |
| 2008/0072303 A1 | 3/2008 | Syed |
| 2008/0104347 A1 | 5/2008 | Iwamura et al. |
| 2008/0114718 A1 | 5/2008 | Anderson et al. |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0134005 A1 | 6/2008 | Izzat et al. |
| 2008/0134311 A1 | 6/2008 | Medvinsky et al. |
| 2008/0141246 A1 | 6/2008 | Kuck et al. |
| 2008/0148135 A1 | 6/2008 | Hughes et al. |
| 2008/0148340 A1 | 6/2008 | Powell et al. |
| 2008/0151917 A1 | 6/2008 | Bartlett et al. |
| 2008/0159145 A1 | 7/2008 | Muthukrishnan et al. |
| 2008/0165801 A1 | 7/2008 | Sheppard |
| 2008/0178278 A1 | 7/2008 | Grinstein et al. |
| 2008/0189468 A1 | 8/2008 | Schmidt et al. |
| 2008/0189757 A1 | 8/2008 | Schackow |
| 2008/0200207 A1 | 8/2008 | Donahue et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0222646 A1 | 9/2008 | Sigal et al. |
| 2008/0224889 A1 | 9/2008 | Wyk |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239953 A1 | 10/2008 | Bai et al. |
| 2008/0239986 A1 | 10/2008 | Xu et al. |
| 2008/0243769 A1 | 10/2008 | Arbour et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0279200 A1 | 11/2008 | Shatzkamer et al. |
| 2008/0281908 A1 | 11/2008 | McCanne et al. |
| 2008/0281944 A1 | 11/2008 | Vorne et al. |
| 2008/0282047 A1 | 11/2008 | Arakawa et al. |
| 2008/0282354 A1 | 11/2008 | Wobber et al. |
| 2008/0288661 A1 | 11/2008 | Galles |
| 2008/0294446 A1 | 11/2008 | Guo et al. |
| 2008/0301760 A1 | 12/2008 | Lim |
| 2008/0316922 A1 | 12/2008 | Riddle et al. |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0028337 A1 | 1/2009 | Balabine et al. |
| 2009/0037975 A1 | 2/2009 | Ishikawa et al. |
| 2009/0041230 A1 | 2/2009 | Williams |
| 2009/0049230 A1 | 2/2009 | Pandya |
| 2009/0055507 A1 | 2/2009 | Oeda |
| 2009/0055607 A1 | 2/2009 | Schack et al. |
| 2009/0070617 A1 | 3/2009 | Arimilli et al. |
| 2009/0077097 A1 | 3/2009 | Lacapra et al. |
| 2009/0077619 A1 | 3/2009 | Boyce |
| 2009/0080440 A1 | 3/2009 | Balyan et al. |
| 2009/0089344 A1 | 4/2009 | Brown et al. |
| 2009/0089487 A1 | 4/2009 | Kwon et al. |
| 2009/0094252 A1 | 4/2009 | Wong et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0106255 A1 | 4/2009 | Lacapra et al. |
| 2009/0106263 A1 | 4/2009 | Khalid et al. |
| 2009/0106413 A1 | 4/2009 | Salo et al. |
| 2009/0119504 A1 | 5/2009 | Van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0132616 A1 | 5/2009 | Winter et al. |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0158068 A1 | 6/2009 | Pudipeddif |
| 2009/0161542 A1 | 6/2009 | Ho |
| 2009/0184585 A1 | 7/2009 | Hartmann |
| 2009/0187915 A1 | 7/2009 | Chew et al. |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0240705 A1 | 9/2009 | Miloushev et al. |
| 2009/0240899 A1 | 9/2009 | Akagawa et al. |
| 2009/0241176 A1 | 9/2009 | Beletski et al. |
| 2009/0248893 A1 | 10/2009 | Richardson et al. |
| 2009/0265396 A1 | 10/2009 | Ram et al. |
| 2009/0265467 A1 | 10/2009 | Peles |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0310493 A1 | 12/2009 | Nogami |
| 2009/0313503 A1 | 12/2009 | Atluri et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017643 A1 | 1/2010 | Baba et al. |

(56) References Cited

U.S. PATENT DOCUMENTS

| | | |
|---|---|---|
| 2010/0017846 A1 | 1/2010 | Huang et al. |
| 2010/0023582 A1 | 1/2010 | Pedersen et al. |
| 2010/0030777 A1 | 2/2010 | Panwar et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0077226 A1 | 3/2010 | Senga et al. |
| 2010/0082542 A1 | 4/2010 | Feng et al. |
| 2010/0093318 A1 | 4/2010 | Zhu et al. |
| 2010/0115236 A1 | 5/2010 | Bataineh et al. |
| 2010/0122091 A1 | 5/2010 | Huang et al. |
| 2010/0122248 A1 | 5/2010 | Robinson et al. |
| 2010/0131654 A1 | 5/2010 | Malakapalli et al. |
| 2010/0150154 A1 | 6/2010 | Viger et al. |
| 2010/0154031 A1 | 6/2010 | Montemurro et al. |
| 2010/0162014 A1 | 6/2010 | Memon |
| 2010/0165877 A1 | 7/2010 | Shukla et al. |
| 2010/0179984 A1 | 7/2010 | Sebastian |
| 2010/0180349 A1 | 7/2010 | Koohgoli |
| 2010/0188976 A1 | 7/2010 | Rahman et al. |
| 2010/0189052 A1 | 7/2010 | Kavanagh et al. |
| 2010/0199042 A1 | 8/2010 | Bates et al. |
| 2010/0205206 A1 | 8/2010 | Rabines et al. |
| 2010/0211547 A1 | 8/2010 | Kamei et al. |
| 2010/0218019 A1 | 8/2010 | Eckhard |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0274772 A1 | 10/2010 | Samuels |
| 2010/0278733 A1 | 11/2010 | Karsten et al. |
| 2010/0279733 A1 | 11/2010 | Karsten et al. |
| 2010/0299451 A1 | 11/2010 | Yigang et al. |
| 2010/0306169 A1 | 12/2010 | Pishevar et al. |
| 2010/0318870 A1 | 12/2010 | Utagawa |
| 2010/0322250 A1 | 12/2010 | Shetty et al. |
| 2010/0325257 A1 | 12/2010 | Goel et al. |
| 2010/0325277 A1 | 12/2010 | Muthiah et al. |
| 2010/0325634 A1 | 12/2010 | Ichikawa et al. |
| 2011/0026403 A1 | 2/2011 | Shao |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0098087 A1 | 4/2011 | Tseng |
| 2011/0099135 A1 | 4/2011 | Machulsky |
| 2011/0099146 A1 | 4/2011 | McAlister et al. |
| 2011/0099420 A1 | 4/2011 | McAlister et al. |
| 2011/0107077 A1 | 5/2011 | Henderson et al. |
| 2011/0113095 A1 | 5/2011 | Hatami-Hanza |
| 2011/0119234 A1 | 5/2011 | Schack et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0176465 A1 | 7/2011 | Panta |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig et al. |
| 2011/0213911 A1 | 9/2011 | Eldus et al. |
| 2011/0246800 A1 | 10/2011 | Accpadi et al. |
| 2011/0264736 A1* | 10/2011 | Zuckerberg ............ G06Q 30/02 709/204 |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0296411 A1 | 12/2011 | Tang et al. |
| 2011/0314178 A1 | 12/2011 | Kanode et al. |
| 2011/0320882 A1 | 12/2011 | Beaty et al. |
| 2011/0321122 A1 | 12/2011 | Mwangi et al. |
| 2012/0014265 A1 | 1/2012 | Schlansker |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0042115 A1 | 2/2012 | Young |
| 2012/0042160 A1 | 2/2012 | Nakhjiri et al. |
| 2012/0063314 A1 | 3/2012 | Pignataro et al. |
| 2012/0066489 A1 | 3/2012 | Ozaki et al. |
| 2012/0078856 A1 | 3/2012 | Linde |
| 2012/0079055 A1 | 3/2012 | Robinson |
| 2012/0101952 A1 | 4/2012 | Raleigh et al. |
| 2012/0117028 A1 | 5/2012 | Gold et al. |
| 2012/0124372 A1 | 5/2012 | Dilley et al. |
| 2012/0144049 A1 | 6/2012 | Lopez Nieto et al. |
| 2012/0144229 A1 | 6/2012 | Nadolski |
| 2012/0150699 A1 | 6/2012 | Trapp et al. |
| 2012/0150805 A1 | 6/2012 | Pafumi et al. |
| 2012/0159249 A1 | 6/2012 | Son et al. |
| 2012/0191847 A1 | 7/2012 | Nas et al. |
| 2012/0195273 A1 | 8/2012 | Iwamura et al. |
| 2012/0198043 A1 | 8/2012 | Hesketh et al. |
| 2012/0198512 A1 | 8/2012 | Jain et al. |
| 2012/0224531 A1 | 9/2012 | Karuturi et al. |
| 2012/0254293 A1 | 10/2012 | Winter et al. |
| 2012/0257506 A1 | 10/2012 | Bazlamacci et al. |
| 2012/0258766 A1 | 10/2012 | Cho et al. |
| 2012/0311153 A1 | 12/2012 | Morgan |
| 2012/0317266 A1 | 12/2012 | Abbott |
| 2013/0007239 A1 | 1/2013 | Agarwal et al. |
| 2013/0028085 A1 | 1/2013 | Bilodeau |
| 2013/0029726 A1 | 1/2013 | Berionne et al. |
| 2013/0031060 A1 | 1/2013 | Lowery et al. |
| 2013/0058229 A1 | 3/2013 | Casado et al. |
| 2013/0058252 A1 | 3/2013 | Casado et al. |
| 2013/0058255 A1 | 3/2013 | Casado et al. |
| 2013/0086237 A1 | 4/2013 | Cutler |
| 2013/0086626 A1 | 4/2013 | Kavantzas |
| 2013/0091002 A1 | 4/2013 | Christie et al. |
| 2013/0117313 A1 | 5/2013 | Miao |
| 2013/0163758 A1 | 6/2013 | Swaminathan et al. |
| 2013/0182713 A1 | 7/2013 | Giacomoni et al. |
| 2013/0198322 A1 | 8/2013 | Oran et al. |
| 2013/0205361 A1 | 8/2013 | Narayanaswamy et al. |
| 2013/0219456 A1* | 8/2013 | Sharma ............... H04L 63/0815 726/1 |
| 2013/0238472 A1 | 9/2013 | Fan et al. |
| 2013/0239166 A1 | 9/2013 | MacLeod |
| 2013/0336122 A1 | 12/2013 | Baruah et al. |
| 2014/0025823 A1 | 1/2014 | Szabo et al. |
| 2014/0040478 A1 | 2/2014 | Hsu et al. |
| 2014/0040979 A1* | 2/2014 | Barton .................... H04L 63/20 726/1 |
| 2014/0059678 A1 | 2/2014 | Parker |
| 2014/0071895 A1 | 3/2014 | Bane et al. |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0136676 A1 | 5/2014 | Chow et al. |
| 2014/0019605 A1 | 6/2014 | Boberg et al. |
| 2014/0162705 A1 | 6/2014 | de Wit et al. |
| 2014/0171089 A1 | 6/2014 | Janakiraman et al. |
| 2014/0187199 A1 | 7/2014 | Yan et al. |
| 2014/0269484 A1 | 9/2014 | Dankberg et al. |
| 2014/0286316 A1 | 9/2014 | Park et al. |
| 2014/0317404 A1 | 10/2014 | Carlson et al. |
| 2014/0359696 A1 | 12/2014 | Mallia |
| 2015/0058595 A1 | 2/2015 | Gura et al. |
| 2016/0255117 A1* | 9/2016 | Sinha ................. H04L 63/0227 726/1 |

(56) References Cited

U.S. PATENT DOCUMENTS

| | | | | |
|---|---|---|---|---|
| 2017/0017364 | A1* | 1/2017 | Kekki | G06F 3/0483 |
| 2017/0208054 | A1* | 7/2017 | Hanay | H04L 63/08 |

FOREIGN PATENT DOCUMENTS

| | | | |
|---|---|---|---|
| CA | 2512312 | A1 | 7/2004 |
| DE | 4306719 | A1 | 9/1993 |
| DE | 4411448 | A1 | 10/1995 |
| DE | 10055689 | A1 | 5/2002 |
| DE | 10152543 | A1 | 5/2003 |
| DE | 10320343 | A1 | 12/2004 |
| DE | 102004020998 | A1 | 11/2005 |
| DE | 102004041821 | A1 | 3/2006 |
| DE | 102004043515 | A1 | 3/2006 |
| DE | 102004049482 | A1 | 4/2006 |
| DE | 102005003794 | A1 | 8/2006 |
| DE | 102006010990 | A1 | 9/2006 |
| DE | 102005030829 | A1 | 1/2007 |
| EP | 0493286 | | 7/1992 |
| EP | 0605088 | | 2/1996 |
| EP | 0 738 970 | A1 | 10/1996 |
| EP | 0744850 | A2 | 11/1996 |
| EP | 1081918 | | 8/2000 |
| EP | 1544535 | A1 | 6/2005 |
| EP | 1662349 | A1 | 5/2006 |
| JP | 63010250 | A | 1/1988 |
| JP | 6205006 | | 7/1994 |
| JP | 06-332782 | | 12/1994 |
| JP | 821924 | | 3/1996 |
| JP | 08-328760 | | 12/1996 |
| JP | 08-339355 | | 12/1996 |
| JP | 9016510 | A | 1/1997 |
| JP | 11282741 | A | 10/1999 |
| JP | 2000183935 | | 6/2000 |
| NZ | 566291 | A | 12/2008 |
| WO | WO 91/14326 | | 9/1991 |
| WO | WO 95/05712 | | 2/1995 |
| WO | WO 97/09805 | | 3/1997 |
| WO | WO 97/45800 | | 12/1997 |
| WO | WO 99/05829 | | 2/1999 |
| WO | WO 99/06913 | | 2/1999 |
| WO | WO 99/10858 | | 3/1999 |
| WO | WO 99/39373 | | 8/1999 |
| WO | WO 99/64967 | | 12/1999 |
| WO | WO 99/66675 | | 12/1999 |
| WO | WO 00/04422 | | 1/2000 |
| WO | WO 00/04458 | | 1/2000 |
| WO | WO 00/58870 | | 3/2000 |
| WO | WO 00/35163 | | 6/2000 |
| WO | WO 2002/39696 | | 5/2002 |
| WO | WO 02/056181 | A2 | 7/2002 |
| WO | WO 2004/061605 | A2 | 7/2004 |
| WO | WO 2006/091040 | | 8/2006 |
| WO | WO 2007/071032 | A1 | 6/2007 |
| WO | WO 2007/085704 | A1 | 8/2007 |
| WO | WO 2008/130983 | A1 | 10/2008 |
| WO | WO 2008/147973 | A2 | 12/2008 |

OTHER PUBLICATIONS

Kühn, S., et al., "Current and Advanced Protocols over ATM: Evaluation, Implementation and Experiences," Dresden University of Technology; Department of Computer Science, pp. 1-13, Dresden, Germany. (1996).

Parulkar G., et al., "aItPm: Strategy for Integrating IP with ATM," Department of Computer Science, Washington University, pp. 1-10, St. Louis, MO, USA. (1995).

Vangala, S., et al., "Performance of TCP over Wireless Networks with the Snoop Protocol," Department of Computer Science and Engineering, University of South Florida, pp. 1-2, Tampa, FL. (2002).

F5 Networks, Inc., "BIG-IP® Access Policy Manager® and BIG-IP® Edge Client™ for iOS v2.0.8 ", Technical Notes, May 5, 2016, pp. 1-38, version 2.0.8, F5 Networks, Inc.

F5 Networks, Inc., "BIG-IP® Access Policy Manager®: Application Access Guide", Jun. 6, 2013, pp. 1-26, version 11.4, F5 Networks, Inc.

F5 Networks, Inc., "BIG-IP® Access Policy Manager®: Visual Policy Editor", Feb. 17, 2015, pp. 1-92, version 11.5.2, F5 Networks, Inc.

F5 Networks, Inc., "BIG-IP Access Policy Management Operations Guide", May 5, 2015, pp. 1-168, F5 Networks, Inc.

F5 Networks, Inc., "BIG-IP® Access Policy Manager®: Edge Client and Application Configuration", Jan. 31, 2014 pp. 1-66, version 11.5, F5 Networks, Inc.

F5 Networks, Inc., "BIG-IP® Access Policy Manager®: Implementations", Jan. 31, 2014 pp. 1-78, version 11.5, F5 Networks, Inc.

F5 Networks, Inc., "BIG-IP® Access Policy Manager®: Secure Web Gateway Implementations", Jan. 31, 2014 pp. 1-100, version 11.5, F5 Networks, Inc.

"A Process for Selective Routing of Servlet Content to Transcoding Modules," Research Disclosure 422124, IBM Corporation, pp. 889-890, Jun. 1999.

"A Storage Architecture Guide," Second Edition, 2001, Auspex Systems, Inc., www.auspex.com, last accessed on Dec. 30, 2002.

"Application Layer Processing (ALP)," Chapter 9, CN-5000E/5500E, Crescendo Networks, pp. 168-186, 2003-2009.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"CSA Persistent File System Technology," A White Paper, Jan. 1, 1999, pp. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.

"Scaling Next Generation Web Infrastructure with Content-Intelligent Switching: White Paper," Apr. 2000, pp. 1-9, Alteon Web Systems, Inc.

"Servlet/Applet/HTML Authentication Process With Single Sign-On," Research Disclosure 429128, IBM Corporation, pp. 163-164, Jan. 2000.

"Shared Cipher Spec Protocol," IBM technical Disclosure Bulletin, Apr. 2000, UK.

"The AFS File System in Distributed Computing Environment," www.transarc.ibm.com/Library/whitepapers/AFS/afsoverview.html, last accessed on Dec. 20, 2002.

"Traffic Surges; Surge Queue; Netscaler Defense," 2005 Citrix Systems, Inc., PowerPoint Presentation, slides 1-12.

"VERITAS SANPoint Foundation Suite(tm) and SANPoint Foundation Suite(tm) HA: New VERITAS Volume Management and File System Technology for Cluster Environments," Sep. 2001, 26 pages, VERITAS Software Corp.

"Windows Clustering Technologies—An Overview," Nov. 2001, 31 pages, Microsoft Corp., www.microsoft.com, last accessed on Dec. 30, 2002.

"Windows Server 2003 Kerberos Extensions," Microsoft TechNet, 2003 (Updated Jul. 31, 2004), http://technet.microsoft.com/en-us/library/cc738207, Microsoft Corporation.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Aguilera et al., "Improving recoverability in multi-tier storage systems," International Conference on Dependable Systems and Networks (DSN-2007), Jun. 2007, 10 pages, Edinburgh, Scotland.

Allman M., et al., "Enhancing TCP's Loss Recovery Using Limited Transmit," Network Working Group, Standards Track, Jan. 2001, RFC: 3042, pp. 1-11, (htpp://hjp.at/doc/rfc/rfc3042 html).

(56) References Cited

OTHER PUBLICATIONS

Almesberger Werner, et al., "Application Requested IP over ATM (Arequipa) and its use in the Web," Laboratoire de Reseaux de Communication, pp. 1-9, Swiss Federal Institute of Technology, Lusanne, Switzerland.

Anderson et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, 40 pages, Association for Computing Machinery, Inc.

Anonymous, "How DFS Works: Remote File Systems," Distributed File System (DFS) Mar. 2003, 54 pages, Technical Reference retrieved from the Internet on Feb. 13, 2009, URL<http://technetmicrosoft.com/en-us/library/cc782417(WS.10,printer).aspx>.

Apple, Inc., "Mac OS X Tiger Keynote Intro. Part 2," Jun. 2004, www.youtube.com <http://www.youtube.com/watch?v=zSBJwEmRJbY>, 1 page.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

Australian Examination Report on 2008225072, dated Nov. 17, 2011.

Baer, T., et al., "The elements of Web services" ADTmag.com, Dec. 1, 2002, pp. 1-6, (http://www.adtmag.com).

Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.

Blue Coat, "Technology Primer: CIFS Protocol Optimization," Blue Coat Systems Inc., 2007, last accessed: Dec. 9, 2013, pp. 1-3, (http://www.bluecoat.com).

Border J., et al., "PILC: Performance Enhancing Proxies (PEPS)," 46th IETF, Nov. 10, 1999, pp. 1-17.

Border, J., et al., "Performance Enhancing Proxies Intended to Mitigate Link-Related Degradations," PILC—Performance Enhancing Proxies, Jun. 2001, RFC: 3135, pp. 1-45.

Botzum, Keys, "Single Sign On—A Contrarian View," Aug. 6, 2001, pp. 1-8, Open Group Website, http://www.opengroup.org/security/topics.htm.

Cabrera et al., "Swift: A Storage Architecture for Large Objects," In Proceedings of the-Eleventh IEEE Symposium on Mass Storage Systems, Oct. 1991, pp. 123-128.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, 22 pages, Technical report No. UCSC-CRL-92-09 of the Computer & Information Sciences Department of University of California at Santa Cruz.

Callaghan et al., "NFS Version 3 Protocol Specifications" (RFC 1813), Jun. 1995, 127 pages, The Internet Engineering Task Force (IETN), www.ietf.org, last accessed on Dec. 30, 2002.

Carns et al., "PVFS: A Parallel File System For Linux Clusters," in Proceedings of the Extreme Linux Track: 4th Annual Linux Showcase and Conference, Oct. 2000, pp. 317-327, Atlanta, Georgia, USENIX Association.

Cavale, M. R., "Introducing Microsoft Cluster Service (MSCS) in the Windows Server 2003", Nov. 2002, 10 pages, Microsoft Corporation.

Cooper, I., et al., "Internet Web Replication and Caching Taxonomy," The Internet Society, Jan. 2001, RFC; 3040, pp. 1-33.

Cooper, I., et al., "Web Proxy Auto-Discovery Protocol," Network Working Group, Nov. 15, 2000, pp. 1-20, Internet Draft.

Davison, B., et al., "A Split Stack Approach to Mobility-Providing Performance-Enhancing Proxies," Lehigh University, Nov. 2002, pp. 1-13, Bethlehem, PA.

Diameter MBLB Support Phase 2: Generic Message Based Load Balancing (GMBLB), last accessed Mar. 29, 2010, pp. 1-10, (http://peterpan.f5net.com/twiki/bin/view/TMOS/TMOSDiameterMBLB).

Dutta D., et al., "An Active Proxy Based Architecture for TCP in Heterogeneous Variable Bandwidth Networks," Proceedings of IEEE Globecome 2001, Nov. 2001, vol. 4, pp. 2316-2320.

Ehsan N., et al., "Evaluation of performance enhancing proxies in internet over satellite," International Journal of Communication Systems, Sep. 17, 2002, 22 pgs.

English Translation of Notification of Reason(s) for Refusal for JP 2002-556371 (Dispatch Date: Jan. 22, 2007).

European Examination Report on 08732021.4, dated Jul. 13, 2011.

European Examination Report on 08732021.4, dated Sep. 3, 2010.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "BIG-IP® Reference Guide, version 4.5", F5 Networks Inc., Sep. 2002, pp. 11-1-11-32, Seattle, Washington.

F5 Networks Inc., "Case Information Log for 'Issues with BoNY upgrade to 4.3'", as early as Feb. 2008.

F5 Networks Inc., "Configuration Guide for Local Traffic Management," F5 Networks Inc., Jan. 2006, version 9.2.2, 406 pgs.

F5 Networks Inc., "Deploying the BIG-IP LTM for Diameter Traffic Management," F5® Deployment Guide, Publication date Sep. 2010, Version 1.2, pp. 1-19.

F5 Networks Inc., "F5 Diameter RM", Powerpoint document, Jul. 16, 2009, pp. 1-7.

F5 Networks Inc., "F5 WANJet CIFS Acceleration", White Paper, F5 Networks Inc., Mar. 2006, pp. 1-5, Seattle, Washington.

F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).

F5 Networks Inc., "Using F5's 3-DNS Controller To Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks, Inc., "BIG-IP Access Policy Management Operations Guide", pp. 1-168, F5 Networks, Inc., published Jul. 2016.

F5 Networks, Inc., "BIG-IP® Acceleration: Implementations", F5 Networks, Inc., Version 11.5, Jan. 27, 2014, pp. 1-172.

F5 Networks, Inc., "BIG-IP® Access Policy Manager® and BIG-IP® Edge Client™ for iOS v2.0.8", Technical Notes, pp. 1-38, version 2.0.8, F5 Networks, Inc., published May 30, 2016.

F5 Networks, Inc., "BIG-IP® Access Policy Manager®: Application Access Guide", version 11.4, pp. 1-26, F5 Networks, Inc., published May 15, 2013.

F5 Networks, Inc., "BIG-IP® Access Policy Manager®: Edge Client® and Application Configuration", version 11.5, pp. 1-66, F5 Networks, Inc., published Jan. 27, 2014.

F5 Networks, Inc., "BIG-IP® Access Policy Manager®: Implementations", version 11.5, pp. 1-78, F5 Networks, Inc., published Jan. 27, 2014.

F5 Networks, Inc., "BIG-IP® Access Policy Manager®: Secure Web Gateway Implementations", version 11.5, pp. 1-100, F5 Networks, Inc., published Feb. 13, 2014.

F5 Networks, Inc., "BIG-IP® Access Policy Manager®: Visual Policy Editor", version 11.5.2, pp. 1-92, F5 Networks, Inc., published Jan. 28, 2015.

F5 Networks, Inc., "BIG-IP® Local Traffic Manager™: Implementations", F5 Networks, Inc., Version 11.5, Jan. 30, 2014, pp. 1-272.

Fajardo V., "Open Diameter Software Architecture," Jun. 25, 2004, pp. 1-6, Version 1.0.7.

Fan et al., "Summary Cache: A Scalable Wide-Area Protocol", Computer Communications Review, Association Machinery, New York, USA, Oct. 1998, pp. 254-265, vol. 28, Web Cache Sharing for Computing No. 4.

Farley, M., "Enterprise Storage Forum," Jan. 2000, 2 pages, Book Review-Building Storage Networks, 2nd Edition, http://www.enterprisestorageforum.com/sans/features/print/0,,10556_1441201.00.html, Enterprise Storage Forum Staff, last accessed Dec. 20, 2002.

(56) References Cited

OTHER PUBLICATIONS

Fendick et al., "Analysis of Rate-Based Control Strategy with Delayed Feedback," Oct. 1992, vol. 22, Issue 4, pp. 136-148.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176.
Final Office Action, U.S. Appl. No. 10/901,952, dated Apr. 24, 2008.
Floyd et al., "Random Early Detection Gateways for Congestion Avoidance," Aug. 1993, pp. 1-22, IEEE/ACM Transactions on Networking, California.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.
Gibson et al., "NASD Scalable Storage Systems," Jun. 1999, 6 pages, USENIX99, Extreme Linux Workshop, Monterey, California.
Gupta et al., "Algorithms for Packet Classification", Computer Systems Laboratory, Stanford University, CA, Mar./Apr. 2001, pp. 1-29.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "Tiger Shark File System," 1996, in proceedings of IEEE, Spring COMPCON, Santa Clara, CA, www.research.ibm.com, 6 pages, last accessed on Dec. 30, 2002.
Heinz G., "Priorities in Stream Transmission Control Protocol (SCTP) Multistreaming", Thesis submitted to the Faculty of the University of Delaware, Spring 2003, pp. 1-35.
Hochmuth, Phil, "F5, CacheFlow pump up content-delivery lines," Network World Fusion, May 4, 2001, 1 page, Las Vegas, Nevada.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Information Sciences Institute, "Transmission Control Protocol", Darpa Internet Program, Protocol Specification, Sep. 1981, RFC: 793, pp. 1-92, University of Southern California, Marina del Rey, CA, US.
International Preliminary Report on Patentability and Written Opinion, PCT/US2004/024655, dated Jan. 30, 2006.
International Search Report and Written Opinion for International Patent Application No. PCT/US2013/026615 (dated Jul. 4, 2013).
International Search Report and Written Opinion, for International Patent Application No. PCT/US2011/058469, dated Mar. 10, 2015.
International Search Report for International Application No. PCT/US03/41202, dated Sep. 15, 2005.
International Search Report for International Patent Application No. PCT/US 2008/083117 (dated Jun. 23, 2009).
International Search Report for International Patent Application No. PCT/US2008/060449 (dated Apr. 9, 2008).
International Search Report for International Patent Application No. PCT/US2008/064677 (dated Sep. 6, 2009).
International Search Report for International Patent Application No. PCT /US02/00720, dated Jul. 8, 2004.
International Search Report for PCT/US2004/24655, dated Jun. 21, 2005.
International Search Report for PCT/US2008/051993, dated Oct. 1, 2008.
International Search Report for PCT/US2008/056684, dated Jan. 28, 2009.
International Search Report for PCT/US2008/56528, dated Oct. 10, 2008.
International Search Report for PCT/US99/13805, dated Nov. 19, 1999.
Internet Protocol, "DARPA Internet Program Protocol Specification", (RFC:791), Information Sciences Institute, University of Southern California, Sep. 1981, pp. 1-49.
Ishac et al., "On the Performance Proceedings of TCP Spoofing in Satellite Networks," of IEEE MILCOM, 2001, vol. 1, pp. 700-704.
Jacobson et al., "TCP Extensions for High Performance," RFC 1323, May 1, 1992.
Jing J., et al., "Client-Server Computing in Mobile Environments," ACM Computing Surveys, Jun. 1999, vol. 31, No. 2, pp. 117-157.
Kalampoukas et al., "Improving TCP Throughput over Two-Way Asymmetric Links: Analysis and Solutions," In Prov. of Sigmetrics, Aug. 21, 1997, pp. 78-89.
Karamanolis, C. et al., "An Architecture for Scalable and Manageable File Services," HPL-2001-173, Jul. 26, 2001. pp. 1-114.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kawamoto, D., "Amazon files for Web services patent", CNET News.com, Jul. 28, 2005, pp. 1-2, (http://news.com).
Keshav S., et al., "Issues and Trends in Router Design," Cornell University, IEEE Communications Magazine, IEEE Service Center, May 1998, vol. 36, No. 5, pp. 144-151, Piscataway, NJ, US.
Kimball, C.E. et al., "Automated Client-Side Integration of Distributed Application Servers," 13Th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Klayman, J., Response filed by Japanese associate to office action dated Jan. 22, 2007 in corresponding Japanese patent application No. 2002-556371.
Kohl et al., "The Kerberos Network Authentication Service (V5)," RFC 1510, Sep. 1993, 105 pages, http://www.ietf.org/ rfc/rfc1510.txt?number=1510.
Korkuzas, V., Communication pursuant to Article 96(2) EPC dated Sep. 11, 2007 in corresponding European patent application No. 02718824.2-2201, 3 pages.
Kühn, S., et al., "Current and Advanced Protocols over ATM: Evaluation, Implementation and Experiences," Dresden University of Technology; Department of Computer Science, pp. 1-13, Dresden, Germany.
LaMonica M., "Infravio spiffs up Web services registry idea", CNET News.com, May 11, 2004, pp. 1-2, (http://www.news.com).
Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci1527986,00.html>.
Long et al., "Swift/RAID: A distributed RAID System", Computing Systems, Summer 1994, 20 pages, vol. 7.
Mac Vittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.
Macvittie, Lori, "Message-Based Load Balancing", Technical Brief, Jan. 2010, pp. 1-9, F5 Networks, Inc.
Market Research & Releases, CMPP PoC documentation, last accessed Mar. 29, 2010, (http://mainstreet/sites/PD/Teams/ProdMgmt/MarketResearch/Universal).
Market Research & Releases, Solstice Diameter Requirements, last accessed Mar. 29, 2010, (http://mainstreet/sites/PD/Teams/ProdMgmt/MarketResearch/Unisversal).

(56) References Cited

OTHER PUBLICATIONS

Mathis et al., "TCP Selective Acknowledgment Options," RFC 2018, Oct. 1996, (http://www.faqs.org/rfcs/rfc2018.html).
Mitt Kerberos Documentation, "Principal Names and DNS," pp. 1-3 (Jan. 1, 1999).
Modiano E., "Scheduling Algorithms for Message Transmission Over a Satellite Broadcast System," MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Non-Final Office Action, U.S. Appl. No. 10/696,507, dated Apr. 1, 2008.
Non-Final Office Action, U.S. Appl. No. 10/696,507, dated Nov. 14, 2007.
Non-Final Office Action, U.S. Appl. No. 10/901,691, dated Mar. 20, 2008.
Non-Final Office Action, U.S. Appl. No. 10/901,940, dated Aug. 18, 2009.
Non-Final Office Action, U.S. Appl. No. 10/901,940, dated Feb. 20, 2009.
Non-Final Office Action, U.S. Appl. No. 10/901,952, dated Sep. 14, 2007.
Non-Final Office Action, U.S. Appl. No. 10/902,491, dated Dec. 28, 2007.
Non-Final Office Action, U.S. Appl. No. 10/902,493, dated Jan. 7, 2008.
Non-Final Office Action, U.S. Appl. No. 10/902,509, dated Mar. 18, 2008.
Non-Final Office Action, U.S. Appl. No. 11/685,183, dated Apr. 26, 2011.
Non-Final Office Action, U.S. Appl. No. 11/685,183, dated Dec. 11, 2009.
Non-Final Office Action, U.S. Appl. No. 11/685,183, dated Jun. 10, 2010.
Non-Final Office Action, U.S. Appl. No. 11/685,183, dated May 26, 2009.
Non-Final Office Action, U.S. Appl. No. 11/685,183, dated Nov. 19, 2010.
Non-Final Office Action, U.S. Appl. No. 11/685,183, dated Oct. 20, 2011.
Norton et al., "CIFS Protocol Version CIFS-Spec 0.9," 2001, 125 pages, Storage Networking Industry Association (SNIA), www.snia.org, last accessed on Mar. 26, 2001.
Notice of Allowance on U.S. Appl. No. 11/301,825 dated Aug. 15, 2011.
Notice of Allowance on U.S. Appl. No. 12/429,774 dated Feb. 18, 2011.
Novotny et al., "An Online Credential Repository for the Grid: MyProxy," 2001, pp. 1-8.
Office Action, U.S. Appl. No. 10/696,507 dated Apr. 13, 2007.
Office Action, U.S. Appl. No. 10/696,507 dated Nov. 13, 2008.
Office Action, U.S. Appl. No. 10/901,691 dated Feb. 27, 2009.
Office Action, U.S. Appl. No. 10/901,691 dated Oct. 28, 2010.
Office Action, U.S. Appl. No. 10/901,691 dated Sep. 13, 2011.
Office Action, U.S. Appl. No. 10/901,940 dated Aug. 5, 2008.
Office Action, U.S. Appl. No. 10/901,940 dated Jan. 25, 2011.
Office Action, U.S. Appl. No. 10/901,940 dated Jan. 8, 2009.
Office Action, U.S. Appl. No. 10/901,940 dated Jul. 20, 2011.
Office Action, U.S. Appl. No. 10/901,940 dated Sep. 3, 2010.
Office Action, U.S. Appl. No. 10/901,952 dated Mar. 16, 2009.
Office Action, U.S. Appl. No. 10/901,952 dated Oct. 16, 2008.
Office Action, U.S. Appl. No. 10/902,491 dated Jan. 5, 2009.
Office Action, U.S. Appl. No. 10/902,491 dated Jul. 22, 2008.
Office Action, U.S. Appl. No. 10/902,493 dated Aug. 20, 2008.
Office Action, U.S. Appl. No. 10/902,493 dated Jan. 21, 2009.
Office Action, U.S. Appl. No. 10/902,509 dated Aug. 13, 2008.
Office Action, U.S. Appl. No. 10/902,509 dated Nov. 18, 2008.
Office Action, U.S. Appl. No. 11/301,825 dated Aug. 26, 2008.
Office Action, U.S. Appl. No. 11/301,825 dated Feb. 28, 2011.
Office Action, U.S. Appl. No. 11/685,156 dated Oct. 6, 2010.
Office Action, U.S. Appl. No. 11/685,181 dated Dec. 10, 2010.
Office Action, U.S. Appl. No. 11/685,181 dated May 23, 2011.
Office Action, U.S. Appl. No. 11/685,181 dated Sep. 17, 2010.
Office Action, U.S. Appl. No. 12/567,402 dated Jan. 12, 2012.
Office Action, U.S. Appl. No. 12/634,496 dated Mar. 9, 2011.
Office Action, U.S. Appl. No. 12/634,496 dated Oct. 4, 2010.
Ott D., et al., "A Mechanism for TCP-Friendly Transport-level Protocol Coordination", USSENIX Annual Technical Conference, Jun. 10, 2002, University of North Carolina at Chapel Hill, pp. 1-12.
OWASP, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, Jul. 1, 1996, pp. 1-15.
Parulkar G., et al., "aItPm: Strategy for Integrating IP with ATM," Department of Computer Science, Washington University, pp. 1-10, St. Louis, MO, USA.
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004, 5 pages, Royal Holloway, University of London.
Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 677-680, vol. 33, No. 6.
Peterson, M., "Introducing Storage Area Networks," Feb. 1998, 6 pages, InfoStor, www.infostor.com, last accessed on Dec. 20. 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org/publications/library/proceedings/als2000/full_papers/preslan/presl, last accessed on Dec. 20, 2002.
Raghavan B., et al., "Cloud Control with Distributed Rate Limiting", SIGCOMM'07, Aug. 27-31, 2007, pp. 1-11, Department of Computer Science and Engineering, University of California, San Diego, CA.
Respond to server depending on TCP::client_port, DevCentral Forums iRules, pp. 1-6, last accessed Mar. 26, 2010, (http://devcentral.f5.com/Default/aspx?tabid=53&forumid=5&tpage=1&v).
Response filed Jul. 6, 2007 to Office action dated Feb. 6, 2007 for related U.S. Appl. No. 10/336,784, 24 pages.
Response filed Mar. 20, 2008 to Final Office action dated Sep. 21, 2007 for related U.S. Appl. No. 10/336,784, 22 pages.
Restriction Requirement for U.S. Appl. No. 12/567,402 dated Oct. 27, 2011.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph-p. 868, col. 1, paragraph 1.
Rosen E., et al., "MPLS Label Stack Encoding", (RFC:3032) Network Working Group, Jan. 2001, pp. 1-22, (http://www.ietf.org/rfc/rfc3032.txt).
RSYNC, "Welcome to the RSYNC Web Pages," Retrieved from the Internet URL: http://samba.anu.edu.ut.rsync/. (Retrieved on Dec. 18, 2009), 5 pages.
Samaraweera, "Return Link Optimization for Internet Service Provision Using DVB-S Networks," ACM SIGCOMM Computer Communication Review, Jul. 1999, vol. 31, No. 2, pp. 117-157.

(56) References Cited

OTHER PUBLICATIONS

Santos J., et al., "Increasing Effective Link Bandwidth by Suppressing Replicated Data," Proceedings of The USENIX Annual Technical Conference (NO 98), Jun. 1998, pp. 213-224.
Savage et al., "AFRAID—A Frequently Redundant Array of Independent Disks," Jan. 22-26, 1996, pp. 1-13, USENIX Technical Conference, San Diego, California.
Schaefer, Ken, "IIS and Kerberos Part 5—Protocol Transition, Constrained Delegation, S4U2S and S402P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, (http://www.adtmag.com).
Shohoud, Y., "Building XML Web Services with VB .NET and VB 6", Addison Wesley, Sep. 2002, pp. 1-14.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Snoeren A., et al., "Managing Cloud Resources:Distributed Rate Limited", Building and Programming the Cloud Workshop, Jan. 13, 2010, pp. 1-38, UCSDCSE Computer Science and Engineering.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, 24 pages, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Spatcheck, O., et al., "Optimizing TCP Forwarder Performance," IEEE/ACM Transactions on Networking, Apr. 1, 2000, pp. 1-13.
Spring N., et al., "A Protocol-Independent Technique for Eliminating Redundant Network Traffic," Proceedings of SIGCOMM 2000, Aug. 2000.
Stakutis, C., "Benefits of SAN-based file system sharing," Jul. 2000, pp. 1-4, InfoStor, www.infostor.com, last accessed on Dec. 30, 2002, Penn Well Corporation.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Tulloch, Mitch, "Microsoft Encyclopedia of Security," 2003, pp. 218, 300-301, Microsoft Press, Redmond, Washington.
UDDI Overview, Sep. 6, 2000, pp. 1-21, uddi.org, (http://www.uddi.org/).
UDDI Technical White Paper, Sep. 6, 2000, pp. 1-12, uddi-org, (http://www.uddi.org/).
UDDI Version 3.0.1, UDDI Spec Technical Committee Specification, Oct. 14, 2003, pp. 1-383, uddi.org, (http://www.uddi.org/).
Uesugi, H., Nov. 26, 2008 amendment filed by Japanese associate in response to office action dated May 26, 2008 in corresponding Japanese patent application No. 2002-556371, 5 pages.
Uesugi, H., English translation of office action dated May 26, 2008 in corresponding Japanese patent application No. 2002-556371, 2 pages.
Uesugi, H., Jul. 15, 2008 letter from Japanese associate reporting office action dated May 26, 2008 in corresponding Japanese patent application No. 2002-556371, 2 pages.
Vangala, S., et al., "Performance of TCP over Wireless Networks with the Snoop Protocol," Department of Computer Science and Engineering, University of South Florida, pp. 1-2, Tampa, FL.
Wang B., "Priority and realtime data transfer over the best-effort Internet", Dissertation Abstract,ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Wilkes, J., et al., "The HP AutoRAID Hierarchical Storage System," Feb. 1996, 29 pages, vol. 14, No. 1, ACM Transactions on Computer Systems.
Williams et al., The Ultimate Windows Server 2003 System Administrator's Guide: Forwarding Authentication, 2003, 2 pages, Figure 10.7, Addison-Wesley Professional, Boston, Massachusetts.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).
Written Opinion for PCT/US2004/24655 dated Jun. 21, 2005.
Written Opinion for PCT/US2008/051993 dated Oct. 1, 2008.
Written Opinion for PCT/US2008/56528 dated Oct. 10, 2008.
Yamanegi, K., et al., "Implementation Experiments of the TCP Proxy Mechanism," Nov. 9, 2005.
Zayas, E., "AFS-3 Programmer's Reference: Architectural Overview," Sep. 2, 1991, 37 pages, Version 1.0 (doc. No. FS-00-D160) Transarc Corporation.
Zhu et al., "Generating KDC Referrals to Locate KERBEROS Realms," pp. 1-17 (Oct. 25, 2004).

* cited by examiner

METHODS FOR ADAPTIVE ORGANIZATION OF WEB APPLICATION ACCESS POINTS IN WEBTOPS AND DEVICES THEREOF

This application claims the benefit of U.S. Provisional Patent Application Ser. No. 62/279,439, filed on Jan. 15, 2016, which is hereby incorporated by reference in its entirety.

FIELD

This technology generally relates to enterprise networks, and more particularly to methods and devices for adaptive presentation of web applications.

BACKGROUND

Increasingly, enterprises are supporting "bring your own device" (BYOD) policies for employees whereby the employees use their personal devices to connect to enterprise networks. By connecting to an enterprise network, employees can receive a desktop environment embedded in a web browser or client application executed by their personal devices, which is referred to herein as a webtop, that facilitates access to allowed enterprise web applications.

Secure access systems, referred to herein as access policy management (APM) apparatuses, regulate access to enterprise networks and associated web applications hosted by enterprise web application servers. Accordingly, APM apparatuses store access policies and evaluate the access policies in response to employee login requests in order to identify the allowed enterprise web applications to include with generated and provided webtops.

In some network environments, the number of allowed enterprise web applications can be relatively large resulting in employee difficulty locating access points (e.g., icons or links) for desired enterprise web applications, particularly on mobile devices with relatively small screens. Accordingly, locating enterprise web applications on webtops is currently inefficient and results in reduced productivity for users.

SUMMARY

A method for adaptive presentation of web applications includes identifying, by an access policy management (APM) apparatus, a plurality of web applications that are allowed for a user of a client device. A subset of the allowed web applications the user is likely to use is determined, by the APM apparatus based on stored historical application access pattern data. A webtop comprising access points for the allowed web applications is provided by the APM apparatus. The access points are organized based on the subset of the allowed web applications for presentation to the user on the client device.

An APM apparatus includes memory including programmed instructions stored in the memory and one or more processors configured to be capable of executing the programmed instructions stored in the memory to identify a plurality of web applications that are allowed for a user of a client device. A subset of the allowed web applications the user is likely to use is determined based on stored historical application access pattern data. A webtop comprising access points for the allowed web applications is provided. The access points are organized based on the subset of the allowed web applications for presentation to the user on the client device.

A non-transitory computer readable medium having stored thereon instructions for adaptive presentation of web applications includes executable code which when executed by one or more processors, causes the one or more processors to perform steps comprising identifying a plurality of web applications that are allowed for a user of a client device. A subset of the allowed web applications the user is likely to use is determined based on stored historical application access pattern data. A webtop comprising access points for the allowed web applications is provided. The access points are organized based on the subset of the allowed web applications for presentation to the user on the client device.

This technology has a number of associated advantages including methods, non-transitory computer readable media, and APM apparatuses that more effectively present web application in webtops, thereby facilitating more efficient access to the web application by users of client device, including enterprise network users. This technology advantageously provides a webtop with access points for web applications that are organized based on historical application access pattern data and an analysis of web applications most likely to be accessed by a user in a current session. Accordingly, this technology facilitates adaptive webtops that reduce the amount of time required to locate access points for web applications and improve user productivity.

DETAILED DESCRIPTION

Figure 1:
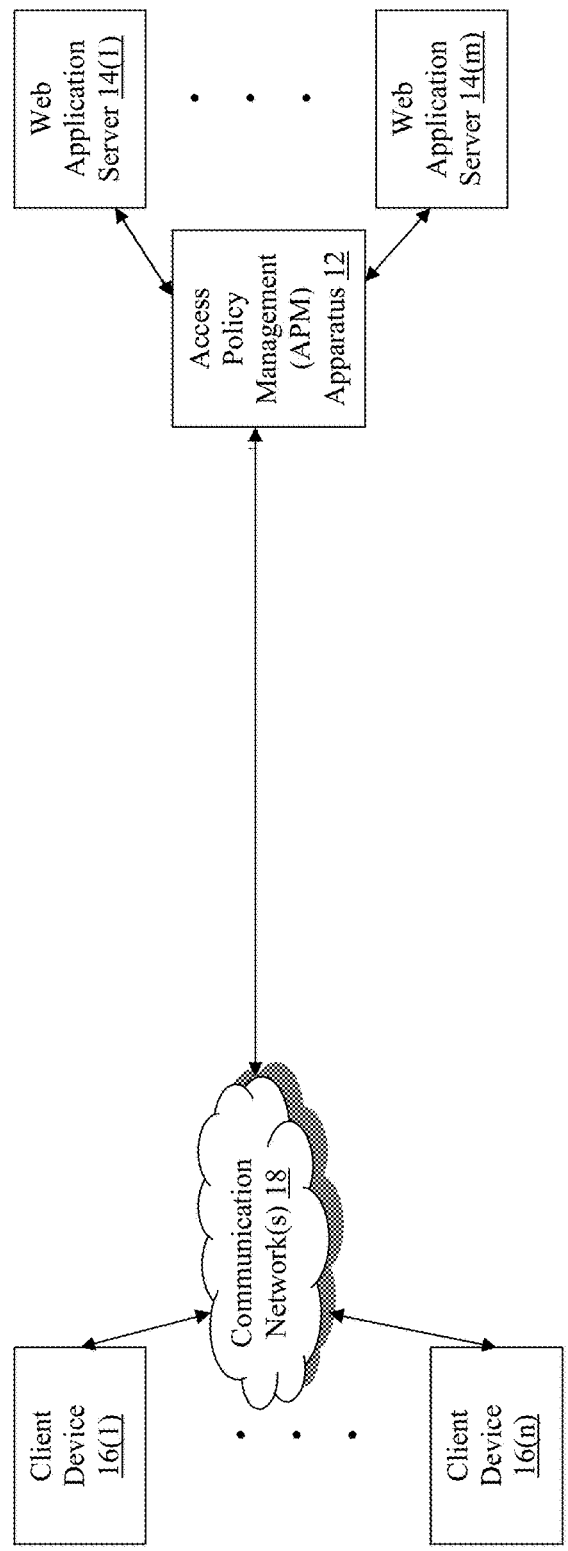
FIG. 1 is a system diagram of a network environment with an exemplary access policy management (APM) apparatus.

Referring to FIG. 1, an exemplary network environment 10 which incorporates an exemplary access policy management (APM) apparatus 12 is illustrated. The APM apparatus 12 is coupled to a plurality of web application servers 14(1)-14(m) and a plurality of client devices 16(1)-16(n) via communication network(s) 18, although the APM apparatus 12, web application servers 14(1)-14(m), and client devices 16(1)-16(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and APM apparatuses that advantageously adapt the presentation of web application access points in webtops based on access patterns, thereby facilitating more efficient access to web applications for users.

Figure 2:
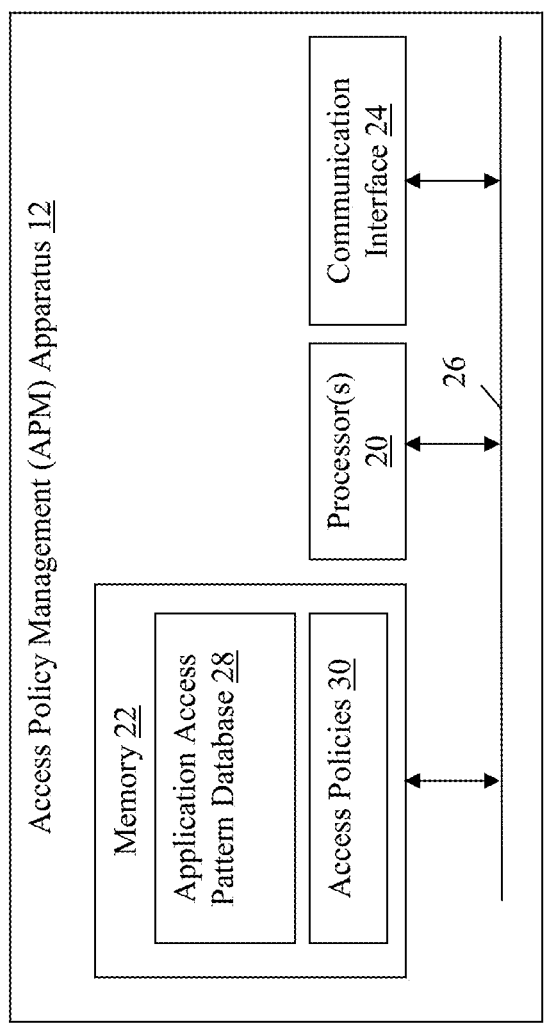
FIG. 2 is a block diagram of the exemplary APM apparatus shown in FIG. 1.

Referring to FIGS. 1-2, the APM apparatus 12 may perform any number of functions including enforcing access policies and providing secure access to backend enterprise web applications hosted by the web application servers

14(1)-14(m) for users of the client devices 16(1)-16(n), managing network traffic, load balancing network traffic across the web application servers 14(1)-14(m), or providing security or firewall services, for example. The APM apparatus 12 includes one or more processor(s) 20, a memory 22, and a communication interface 24, which are coupled together by a bus 26 or other communication link, although the APM apparatus 12 may include other types and numbers of elements in other configurations.

The processor(s) 20 of the APM apparatus may execute programmed instructions stored in the memory 22 of the APM apparatus 12 for the any number of the functions identified above. The processor(s) 20 of the APM apparatus 12 may include one or more CPUs or general purpose processors with one or more processing cores, for example, although other types of processor(s) can also be used.

The memory 22 of the APM apparatus 12 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
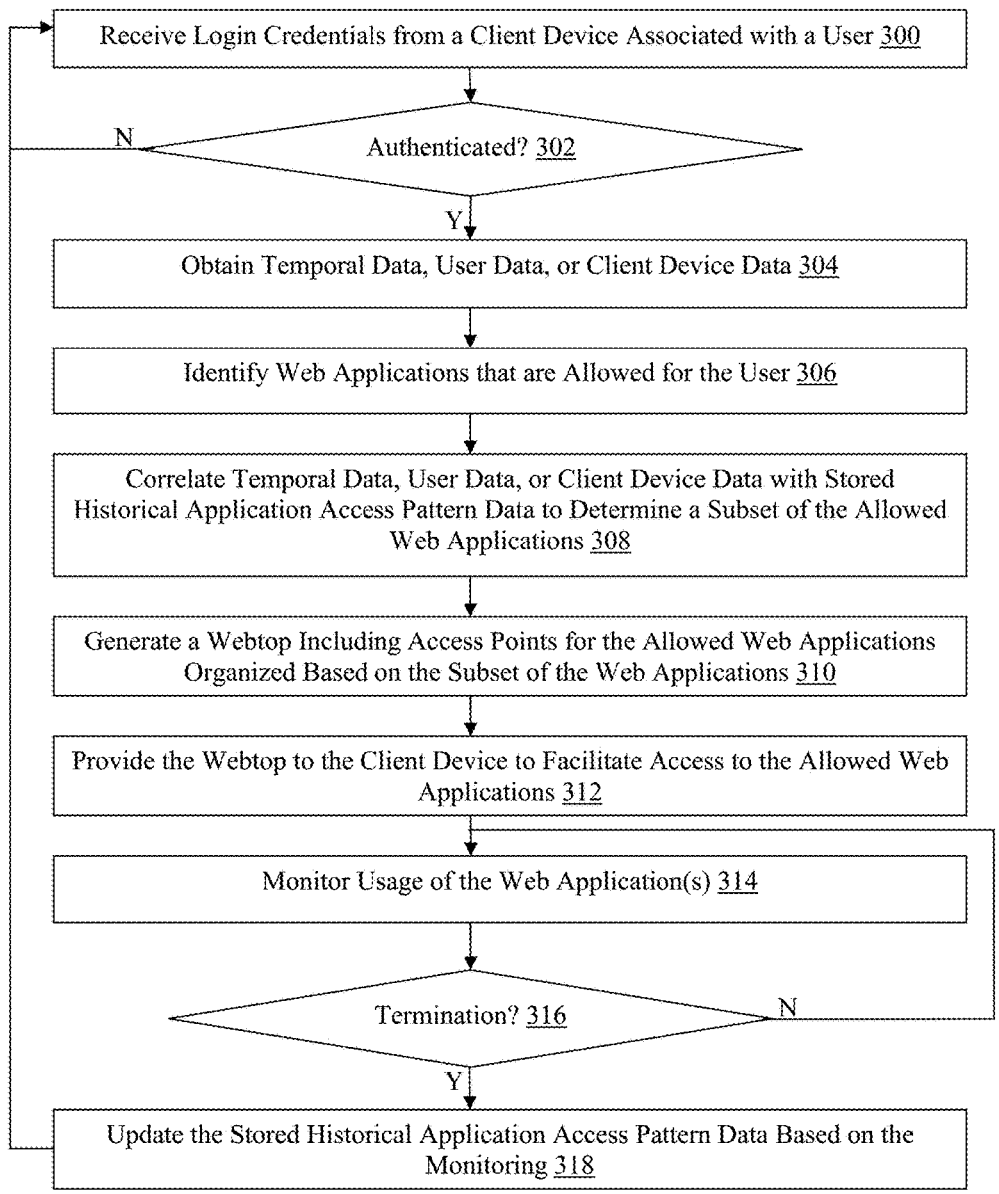
FIG. 3 is a flowchart of an exemplary method for adaptive presentation of web applications.

Accordingly, the memory of the APM apparatus 12 can store one or more applications that can include computer executable instructions that, when executed by the APM apparatus 12, cause the APM apparatus 12 to perform actions, such as to transmit, receive, or otherwise process messages, for example, and to perform other actions described and illustrated below with reference to FIGS. 3-5. The application(s) can be implemented as module or components of another application. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), including the APM apparatus 12 itself, may be located in virtual server(s) running in a cloud-based computing environment rather than being tied to one or more specific physical network computing devices. Also, the application(s) may be running in one or more virtual machines (VMs) executing on the APM apparatus 12. Additionally, in at least one of the various embodiments, virtual machine(s) running on the APM apparatus 12 may be managed or supervised by a hypervisor.

In this particular example, the memory 22 includes an application access pattern database 28 and access policies 30. The access policies 30 in this example are established by an administrator and enforced by the APM apparatus 12 to restrict access by users of the client devices 16(1)-16(n) to allowed backend enterprise web applications hosted by the web application servers 14(1)-14(m).

The application access pattern database 30 in this example stores historical application access pattern data including web application usage data correlated with temporal, user, and/or client device data for a plurality of users of the client devices 16(1)-16(n). The application access pattern database 30 facilitates identification of a subset of allowed web applications for a user upon which access points in a webtop generated for the user are organized. In one example, current temporal, user, and/or client device data for a user can be correlated with historical access pattern date for the user or a group of users sharing one or more characteristics in order to identify the subset of allowed web applications, as described and illustrated in more detail later.

The communication interface 24 operatively couples and communicates between the APM apparatus 12, the web application servers 14(1)-14(m), and the client devices 16(1)-16(n), which are all coupled together by the communication network(s) 18, although other types and numbers of communication networks or systems with other types and numbers of connections and configurations to other devices and elements can also be used.

By way of example only, the communication network(s) 18 can include local area network(s) (LAN(s)) or wide area network(s) (WAN(s)), and can use TCP/IP over Ethernet and industry-standard protocols, although other types and numbers of protocols and/or communication networks can be used. The communication network(s) 18 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The communication network(s) 18 can also include direct connection(s) (e.g., for when a device illustrated in FIG. 1, such as the APM apparatus 12, client devices 16(1)-16(n), or web application servers 14(1)-14(m), for example, operate as virtual instances on the same physical machine). In some examples, the communication network(s) 18 can be the Internet, although other types of networks can also be included in the network environment 10.

While the APM apparatus 12 is illustrated in this example as including a single device, the APM apparatus 12 in other examples can include a plurality of devices or blades each with one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices.

Additionally, one or more of the devices that together comprise the APM apparatus 12 in other examples can be standalone devices or integrated with one or more other devices or applications, such as one of the web application servers 14(1)-14(m) or a network traffic management device coupled to the communication network(s), for example. Moreover, one or more of the devices of the APM apparatus 12 in these examples can be in a same or a different communication network including one or more public, private, or cloud networks, for example.

Each of the web application servers 14(1)-14(m) includes a processor, a memory, and a communication interface, which are coupled together by a bus or other communication link, although other numbers and types of network devices could be used. The web application servers 14(1)-14(m) in this example process requests received from the client devices via the communication network(s) 18 according to the HTTP-based application RFC protocol, for example. Various backend enterprise web applications may be operating on the web application servers 14(1)-14(m) and transmitting data (e.g., files or Web pages) to the client devices 16(1)-16(n) via the APM apparatus 12 in response to requests from the client devices 16(1)-16(n). The web application servers 14(1)-14(m) may be hardware or software or may represent a system with multiple servers in a pool, which may include internal or external networks.

Although the web applications servers 14(1)-14(m) are illustrated as single web application servers, one or more actions of one or more of the web application servers 14(1)-14(m) may be distributed across one or more distinct network computing devices. Moreover, the web application servers 14(1)-14(m) are not limited to a particular configuration. Thus, the web application servers 14(1)-14(m) may contain a plurality of network computing devices that operate using a master/slave approach, whereby one of the network computing devices of the web application servers 14(1)-14(m) operate to manage and/or otherwise coordinate operations of the other network computing devices. The web application servers 14(1)-14(m) may operate as a plurality of network computing devices within a cluster architecture, a peer-to peer architecture, virtual machines, or within a cloud architecture.

Thus, the technology disclosed herein is not to be construed as being limited to a single environment and other configurations and architectures are also envisaged. For example, one or more of the web application servers 14(1)-14(m) depicted in FIG. 1 can operate within the APM apparatus 12 itself rather than as a stand-alone web application server communicating with the APM apparatus 12 via the communication network(s) 18. In this example the one or more web application servers 14(1)-14(m) operate within the memory 22 of the APM apparatus 12.

The client devices 16(1)-16(n) can include any type of computing device that can receive, render, and facilitate user interaction with a webtop, such as mobile computing devices, desktop computing devices, laptop computing devices, tablet computing devices, virtual machines (including cloud-based computer), or the like. Each of the client devices 16(1)-16(n) in this example includes a processor, a memory, and a communication interface, which are coupled together by a bus or other communication link, although other numbers and types of network devices could be used.

The client devices 16(1)-16(n) may run interface applications, such as standard Web browsers or standalone client applications, which may provide an interface to make requests for, and receive content stored on, one or more of the web application servers 14(1)-14(m) via the communication network(s) 18. In particular, the Web browsers of the client devices 16(1)-16(n), or standalone client applications executing on the client devices 16(1)-16(n), can render a webtop provided by the APM apparatus 12 that provides access points to web applications hosted on the web application servers 14(1)-14(m). The client devices 16(1)-16(n) may further include a display device, such as a display screen or touchscreen, and/or an input device, such as a keyboard for example. The client devices 16(1)-16(n) could be implemented as applications on the APM apparatus 12 itself in some examples.

Although the exemplary network environment 10 with the APM apparatus 12, web application servers 14(1)-14(m), client devices 16(1)-16(n), and communication network(s) 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the APM apparatus 12, client devices 16(1)-16(n), or web application servers 14(1)-14 (m), for example, may be configured to operate as virtual instances on the same physical machine. In other words, one or more of the APM apparatus 12, client devices 16(1)-16(n), or web application servers 14(1)-14(m) illustrated in FIG. 1 may operate on the same physical device rather than as separate devices communicating through the communication network(s) 18 as depicted in FIG. 1. There may be more or fewer APM apparatuses 12, client devices 16(1)-16(n), or web application servers 14(1)-14(m) than depicted in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein, which when executed by one or more processors, cause the processors to carry out the steps necessary to implement the methods of the examples, as described and illustrated herein.

An exemplary method of adaptive presentation of web applications will now be described with reference to FIGS. 1-5. Referring more specifically to FIG. 3, in step 300 in this example, the APM apparatus 12 receives login credentials from one of the client devices 16(1)-16(n) associated with a user. In one example, the user is an employee of an enterprise and the login credentials are submitted via a login web page. The login web page can be received from the APM apparatus 12 and can originate from one of the web application servers 14(1)-14(m), and can be rendered via a web browser of the one of the client devices 16(1)-16(n) or a client application executing on the one of the client devices 16(1)-16(n), for example.

In step 302, the APM apparatus 12 determines whether the user is authenticated based on the login credentials, such as by communicating with an active directory server, as needed. If the APM apparatus 12 determines that the user is not authenticated, then the No branch is taken back to step 300 and login credentials are again obtained from the one of the client devices 16(1)-16(n) or another of the client devices 16(1)-16(n). However, if the APM apparatus 12 determines in step 302 that the user is authenticated, then the Yes branch is taken to step 304.

In step 304, the APM apparatus 12 obtains temporal data, user data for the user, and client device data, although other types and/or amounts of other data may be obtained. In this particular example, the temporal data includes one or more of a time of day, a day of the week, or a date of the month, although other temporal data could be used in other examples. Accordingly, the temporal data can be obtained from a local clock, a calendar application. or a database, for example, although the temporal data can also be obtained from other sources.

The user data in this example includes one or more of a role, a group, or a location, although other user data can also be used in other examples. The role can be a position of the user in the enterprise (e.g., manager or executive), the group can be a department in the enterprise (e.g., IT, engineering, or legal), and the location can be an office location within the enterprise (e.g., a city or geographic coordinates). Accordingly, the user data can be obtained from an enterprise database or via active directory queries to an active directory server, for example, although the user data can also be obtained from other sources.

In this particular example, the client device data includes one or more of a web browser type, an operating system type, or a standalone application type, for example, wherein the type can include a version or any other characteristic of the web browser, operating system, or standalone application. Other client device data can also be used in other examples. Accordingly, the client device data can be obtained based on header(s) included with the login request that included the login credentials or by querying the one of the client devices 16(1)-16(n), for example.

In some examples, one or more portions of the user data or client device data can be static and stored locally or in an enterprise database as associated with the user (e.g., based on the login credentials). The client device data can also be obtained from other sources and other types and numbers of client device data can also be obtained in other examples.

In step 306, the APM apparatus 12 identifies enterprise web applications (e.g. that may be hosted by the web application servers 14(1)-14(m)) that are allowed for the user. The enterprise web application can be identified based on an application of one or more of the access policies 30 to one or more portions of the temporal data, user data, or client device data obtained in step 304.

Figure 4:
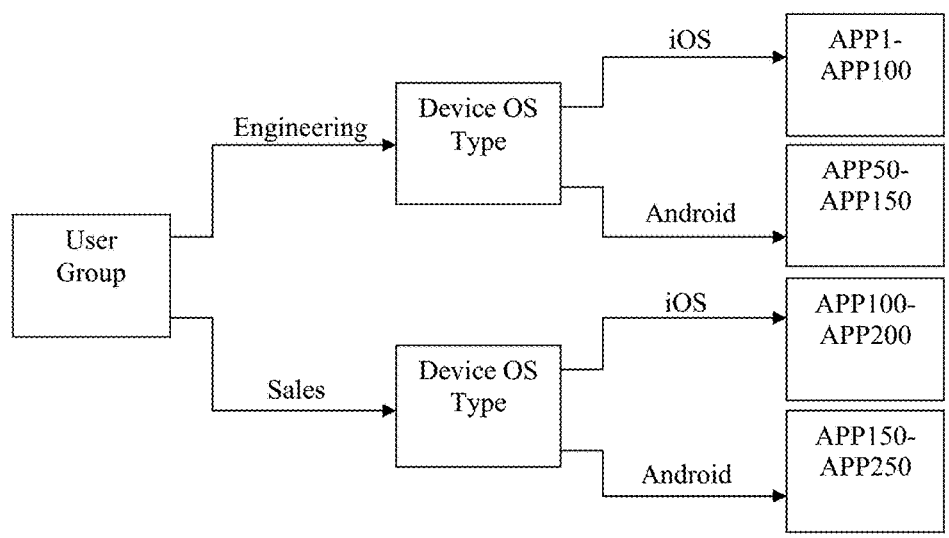
FIG. 4 is a block diagram of an exemplary application of an access policy to identify allowed web applications for a user.

Referring more specifically to FIG. 4, a block diagram illustrating an exemplary application of one of the access policies 30 to identify allowed enterprise web applications for the user is illustrated. In this particular example, the APM apparatus 12 sends an active directory query in step 304 to an active directory server associated with the enterprise, using a unique identifier for the user, to obtain user data including the user group (e.g., engineering or sales). Additionally, the APM apparatus 12 retrieves OS type information from the one of the client devices 16(1)-16(n) in step 304.

Accordingly, if the APM apparatus 12 determines that the user in this example is in the engineering user group and the one of the client devices 16(1)-16(n) has an iOS operating system, then the APM apparatus 12 evaluating the one of the access policies 30 identifies APP1-APP100 as being allowed web applications for the user. In another example, the APM apparatus 12 may apply a rule or perform a lookup based on the login credentials, or a portion thereof, obtained in step 300 in order to identify the enterprise web applications that are allowed for the user. Any other type, combination, or order of data or any other type of access policies 30 can also be used by the APM apparatus 12 to identify the allowed web application for the user in other examples.

Referring back to FIG. 3, in step 308, the APM apparatus 12 correlates the temporal, user, or client device data obtained in step 304 with historical application access pattern data stored in the application access pattern database 28 to determine a subset of the allowed web applications most likely to be accessed by the user of the one of the client devices 16(1)-16(n) in the current session, although other types and/or amounts of data could be correlated. Accordingly, in this example the historical application access pattern data includes temporal, user, or client device data correlated with web application usage data obtained based on monitoring historical usage of the web applications by the users of the client devices 16(1)-16(n), optionally including the particular user of the one of the client devices 16(1)-16(n) if previously obtained.

For example, the historical application access pattern data may indicate that user X is a developer in the engineering group that has used web applications Y and Z every business day for the last six months. In another example, the historical application access pattern data may indicate that user A is an accountant in the accounting group that has used web application C on the last day of each of the last 18 months. Other types of historical application access pattern data can also be used or stored in the application access pattern database.

Accordingly, the temporal, user, or client device data obtained in step 304 for a user of a current session is correlated with historical application access pattern data for the user and/or one or more other users to determine a subset of the allowed applications identified in step 306. In one example, the APM apparatus 12 optionally determines whether the authenticated login credentials for the user are received for a first time from the one of the client devices 16(1)-16(n). The determination can be based on whether there is an entry in the application access pattern database 28 corresponding to a unique identifier for the user, for example.

If the APM apparatus 12 determines that the authenticated login credentials for the user are received for the first time from the one of the client devices 16(1)-16(n), then the correlated historical application access pattern data in step 308 can be historical application access pattern data for one or more other users associated with a same enterprise as the user and sharing a portion of one or more of the user data, client device data, or temporal data. For example, if the user data indicates that the current user is also a developer in the engineering group and the temporal data indicates that it is a business day, then the APM apparatus 12 may include web applications Y and Z in the subset of the allowed web applications identified in step 304 in the example described earlier.

However, if the APM apparatus 12 determines that the authenticated login credentials for the user are not received for the first time from the one of the client devices 16(1)-16(n), then the correlated historical application access pattern data in step 308 can be historical application access pattern data for the user. Accordingly, in this example, the APM apparatus 12 can correlate the current temporal, user, or client device data with historical access pattern data for the same user to determine the subset of the allowed web applications.

In yet other examples, both historical application access pattern data for the user and for one or more other of the users can be correlated with the current temporal, user, or client device data in step 308 in order to determine the subset of the allowed web applications. Also optionally, the APM apparatus 12 determines the subset of the web applications based on statistical analysis, heuristics, or a percentage likelihood that the web applications will be used in the current session based on the strength of the correlation with the historical application access pattern data, for example, although other methods for analyzing the historical application access pattern data or determining the subset of the allowed web applications can also be used.

In step 310, the APM apparatus 12 generates a webtop including graphical access points for the allowed web applications hosted by one or more of the web application servers 14(1)-14(m) that are organized based on the subset of web applications determined in step 308. The access points can be icons, links, or any other selectable feature that generates an instance of an associated one of the web applications when selected by the user of the one of the client devices 16(1)-16(n).

In this example, the access points for the subset of the web applications are prioritized in the webtop based on an order or grouping, although the access points can be organized in other ways, in order to facilitate more efficient access to the subset of the web applications by the user of the one of the client devices 16(1)-16(n). In step 312, the APM apparatus 12 provides the webtop generated in step 310 to the one of the client devices 16(1)-16(n) to facilitate access to the allowed web applications by the user of the one of the client devices 16(1)-16(n).

Accordingly, with this technology, a relatively small subset of a relatively large number of web applications are prioritized based on an organization of associated access points in the webtop so as to reduce the amount of time required for a user to locate access points for web applications most likely to be used by the user in the current session, and thereby improve user productivity. Additionally, the subset of the web applications are advantageously determined based on historical application access pattern data for the user or one or more other users sharing one or more characteristics, which facilitates a more effective organization of associated access points than presenting the access points based on web applications most recently used by each user or presenting the same access points in a same order for all of the users, for example.

In step 314, the APM apparatus 12 monitors usage of the web application(s) by the user of the one of the client devices 16(1)-16(n) during the current session. For example, the APM apparatus 12 can maintain usage data including which of the web applications were accessed by the user during the current session along with the number of times the web applications were accessed or the length of time that the user engaged with each of the web applications, for example, although other types of usage can be monitored in step 314.

In step 316, the APM apparatus 12 determines whether a termination of the session, initiated upon authentication of the login credentials for the user in step 302, has occurred. If the APM apparatus 12 determines that a termination of the current session has not occurred, then the No branch is taken and the APM apparatus 12 effectively continues monitoring usage of the web applications until a termination of the current session is determined. Accordingly, if the APM apparatus 12 determines that a termination of the current session has occurred, then the Yes branch is taken to step 318.

In step 318, the APM apparatus 12 updates the historical application access pattern data stored in the application access pattern database 28 based on the monitoring and associated collected usage data. Accordingly, the application access pattern database 28 is continually updated based on monitored usage of the web applications by users of the client devices 16(1)-16(n) to improve the accuracy of the determination of the subset of allowed web applications in step 308. Subsequent to updating the stored historical application access pattern data in the application access pattern database 28, or at any time during any of steps 302-318, the APM apparatus 12 receives login credentials from another one of the client devices 16(1)-16(n) in step 300.

Figure 5:
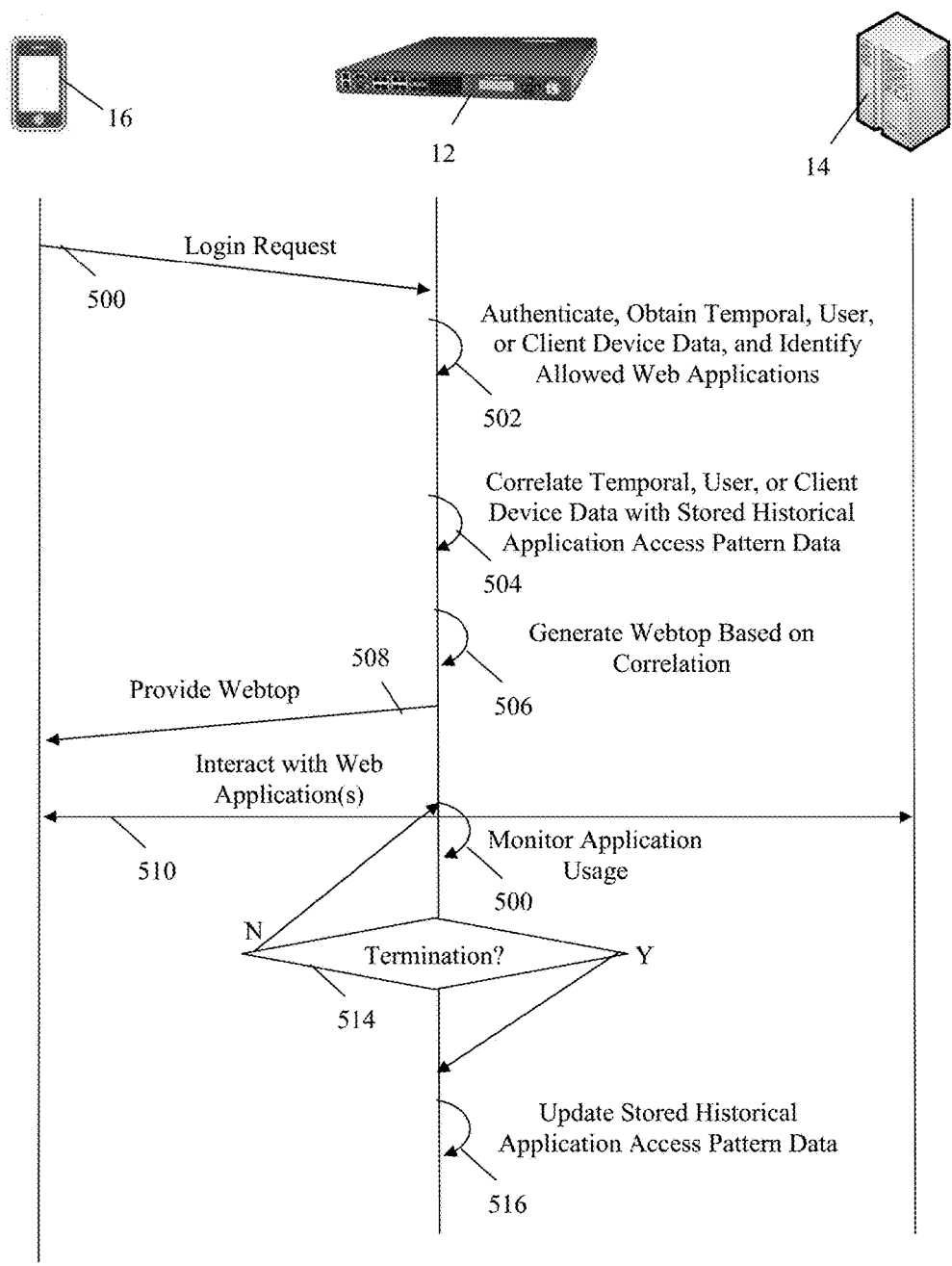
FIG. 5 is a timing diagram of an exemplary method for adaptive presentation of web applications.

Referring more specifically to FIG. 5, a timing diagram illustrating a method for adaptive presentation of web applications is shown. In step 500 in this example, a user of the client device 16 sends a login request to the APM apparatus 12. In step 502, the APM apparatus 12 authenticates the login credentials for the user, obtains temporal, user, or client device data, and identifies allowed web applications for the user by evaluating one or more access policies based on the temporal, user, or client device data.

In step 504, the APM apparatus 12 correlates the temporal, user, or client device data obtained in step 502 with stored historical application access pattern data for the user or one or more other users associated with a same enterprise, for example. As a result of the correlation, the APM apparatus 12 determines a subset of the allowed web applications identified in step 502. The subset of the allowed web applications includes web applications most likely to be used by the user of the client device 16 in the current session.

In step 506, the APM apparatus 12 generates a webtop based on the correlation in step 504. The webtop includes access points for the allowed web applications that are organized based on the determined subset of the allowed web applications. For example, the access points for the subset of the allowed web applications can be represented first, near the top, or in a particular grouping so as to facilitate more efficient access by the user of the client device 16 as compared to other of the allowed web applications. In step 508, the APM apparatus 12 provides the webtop generated in step 506 to the client device 16.

In step 510, the user of the client device 16 interacts with the allowed web applications by communicating requests and other data to the web application server 14 and receiving web pages or other data in response, for example. Concurrently, in step 512, the APM apparatus 12 monitors usage of the allowed web applications including which of the allowed web applications are accessed by the user of the client device 16 in the current session.

In step 514, the APM apparatus 12 determines whether the current session has been terminated by the user of the client device 16. If the APM apparatus 12 determines that the current session has not been terminated by the user of the client device 16, then No branch is taken back to step 512 and the APM apparatus 12 continues monitoring usage of the allowed web applications. However, if the APM apparatus 12 determines in step 514 that the user of the client device 16 has terminated the current session, then the Yes branch is taken to step 516.

In step 516, the APM apparatus 12 updates stored historical access pattern data based on the monitoring performed in step 512. Accordingly, the APM apparatus 12 can update the stored historical application access pattern data to include the temporal, user, or client device data obtained in step 502 correlated with an indication of which of the applications were accessed or other application usage data obtained in step 512, for example.

With this technology, access points for web applications are more effectively presented in webtops to facilitate more efficient access to web applications by users of client devices. Accordingly, this technology advantageously utilizes historical application access pattern data to determine a subset of allowed web applications most likely to be accessed by a user in a current session, and generates and provides a webtop with access points for web applications organized based on the determined subset of the allowed web applications. Thereby, this technology facilitates adaptive webtops that reduce the amount of time required to locate access points for web applications and improve user productivity.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by an enterprise network system comprising one or more access management apparatuses, client devices, or web application server devices, the method comprising:
    monitoring network traffic exchanged with web applications to generate and store historical application access pattern data;
    identifying one or more of the web applications that are allowed for a client based on a stored access policy and in response to a login request received from the client;
    analyzing the stored historical application access pattern data to determine, for at least a subset of the allowed web applications and prior to any of the allowed web applications being accessed by the client in a current session, an indication of whether each of the subset of the allowed web applications will be accessed by the client in the current session;
    generating a webtop configured to, when rendered in a web browser, graphically organize access points for at least the subset of the allowed web applications based on the determined indication; and
    providing the webtop to the client in response to the login request to facilitate access to the subset of the allowed web applications.

2. The method of claim 1, further comprising:
    monitoring usage of one or more of the allowed web applications by the client;
    determining when the current session has terminated, wherein the current session is initiated upon authentication of login credentials included in the login request; and
    updating the stored historical application access pattern data based on the monitoring, when the determining indicates that the current session has terminated.

3. The method of claim 1, further comprising determining when login credentials for a user are received from the client for a first time, wherein:
    the stored historical application access pattern data is for one or more users associated with a same enterprise as the user and sharing one or more of user data, client device data, or temporal data, when the determining indicates that the authenticated login credentials for the user are received for the first time; and
    the stored historical application access pattern data is for the user, when the determining indicates that the authenticated login credentials are not received for the first time.

4. The method of claim 1, wherein the determination is based on a correlation of one or more of obtained temporal data, user data, or client device data, wherein the temporal data comprises one or more of a time, a day, or a date, the user data comprises one or more of a role, a group, or a location, or the client device data comprises one or more of a web browser type, an operating system type, or a standalone application type.

5. The method of claim 1, wherein each of at least a subset of the access points comprises a graphical indication of one of the subset of the allowed web applications and is prioritized in the webtop based on an order or grouping and according to the determined indication.

6. An access management apparatus, comprising memory comprising programmed instructions stored thereon and one or more processors configured to be capable of executing the stored programmed instructions:
    monitor network traffic exchanged with web applications to generate and store historical application access pattern data;
    identify one or more of the web applications that are allowed for a client based on a stored access policy and in response to a login request received from the client;
    analyze the stored historical application access pattern data to determine, for at least a subset of the allowed web applications and prior to any of the allowed web applications being accessed by the client in a current session, an indication of whether each of the subset of the allowed web applications will be accessed by the client in the current session;
    generate a webtop configured to, when rendered in a web browser, graphically organize access points for at least the subset of the allowed web applications based on the determined indication; and
    provide the webtop to the client in response to the login request to facilitate access to the at least the subset of the allowed web applications.

7. The access management apparatus of claim 6, wherein the one or more processors are further configured to be capable of executing the stored programmed instructions to:
    monitor usage of one or more of the allowed web applications by the client;
    determine when the current session has terminated, wherein the current session is initiated upon authentication of login credentials included in the login request; and
    update the stored historical application access pattern data based on the monitoring, when the determining indicates that the current session has terminated.

8. The access management apparatus of claim 6, wherein the processors are further configured to be capable of executing the stored programmed instructions to determine when login credentials for a user are received from the client for a first time, wherein:
    the stored historical application access pattern data is for one or more users associated with a same enterprise as the user and sharing one or more of user data, client device data, or temporal data, when the determining indicates that the authenticated login credentials for the user are received for the first time; and
    the stored historical application access pattern data is for the user, when the determining indicates that the authenticated login credentials are not received for the first time.

9. The access management apparatus of claim 6, wherein the determination is based on a correlation of one or more of obtained temporal data, user data, or client device data, wherein the temporal data comprises one or more of a time, a day, or a date, the user data comprises one or more of a role, a group, or a location, or the client device data comprises one or more of a web browser type, an operating system type, or a standalone application type.

10. The access management apparatus of claim 6, wherein each of at least a subset of the access points comprises a graphical indication of one of the subset of the allowed web applications and is prioritized in the webtop based on an order or grouping and according to the determined indication.

11. A non-transitory computer readable medium having stored thereon instructions comprising executable code which when executed by one or more processors, causes the processors to:
monitor network traffic exchanged with web applications to generate and store historical application access pattern data;
identify one or more of the web applications that are allowed for a client based on a stored access policy and in response to a login request received from the client;
analyze the stored historical application access pattern data to determine, for at least a subset of the allowed web applications and prior to any of the allowed web applications being accessed by the client in a current session, an indication of whether each of the subset of the allowed web applications will be accessed by the client in the current session;
generate a webtop configured to, when rendered in a web browser, graphically organize access points for at least the subset of the allowed web applications based on the determined indication; and
provide the webtop to the client in response to the login request to facilitate access to the at least the subset of the allowed web applications.

12. The non-transitory computer readable medium of claim 11, wherein the executable code, when executed by the processors, further causes the processors to:
monitor usage of one or more of the allowed web applications by the client;
determine when the current session has terminated, wherein the current session is initiated upon authentication of login credentials included in the login request; and
update the stored historical application access pattern data based on the monitoring, when the determining indicates that the current session has terminated.

13. The non-transitory computer readable medium of claim 11, wherein the executable code, when executed by the processors, further causes the processors to determine when login credentials for a user are received from the client for a first time, wherein:
the stored historical application access pattern data is for one or more users associated with a same enterprise as the user and sharing one or more of user data, client device data, or temporal data, when the determining indicates that the authenticated login credentials for the user are received for the first time; and
the stored historical application access pattern data is for the user, when the determining indicates that the authenticated login credentials for the user are not received for the first time.

14. The non-transitory computer readable medium of claim 11, wherein the determination is based on a correlation of one or more of obtained temporal data, user data, or client device data, wherein the temporal data comprises one or more of a time, a day, or a date, the user data comprises one or more of a role, a group, or a location, or the client device data comprises one or more of a web browser type, an operating system type, or a standalone application type.

15. The non-transitory computer readable medium of claim 11, wherein each of at least a subset of the access points comprises a graphical indication of one of the subset of the allowed web applications and is prioritized in the webtop based on an order or grouping and according to the determined indication.

16. An enterprise network system comprising one or more access management apparatuses, client devices, or web application server devices, the enterprise network system comprising memory comprising programmed instructions stored thereon and one or more processors configured to be capable of executing the stored programmed instructions to:
monitor network traffic exchanged with web applications to generate and store historical application access pattern data;
identify one or more of the web applications that are allowed for a client based on a stored access policy and in response to a login request received from the client;
analyze the stored historical application access pattern data to determine, for at least a subset of the allowed web applications and prior to any of the allowed web applications being accessed by the client in a current session, an indication of whether each of the subset of the allowed web applications will be accessed by the client in the current session;
generate a webtop configured to, when rendered in a web browser, graphically organize access points for at least the subset of the allowed web applications based on the determined indication; and
provide the webtop to the client in response to the login request to facilitate access to the at least the subset of the allowed web applications.

17. The enterprise network system of claim 16, wherein the processors are further configured to be capable of executing the stored programmed instructions to:
monitor usage of one or more of the allowed web applications by the client;
determine when the current session has terminated, wherein the current session is initiated upon authentication of login credentials included in the login request; and
updating the stored historical application access pattern data based on the monitoring, when the determining indicates that the current session has terminated.

18. The enterprise network system of claim 16, wherein the processors are further configured to be capable of executing the stored programmed instructions to determine when login credentials for a user are received from the client for a first time, wherein:
the stored historical application access pattern data is for one or more users associated with a same enterprise as the user and sharing one or more of user data, client device data, or temporal data, when the determining indicates that the authenticated login credentials for the user are received for the first time; and
the stored historical application access pattern data is for the user, when the determining indicates that the authenticated login credentials are not received for the first time from.

19. The enterprise network system of claim 16, wherein the determination is based on a correlation of one or more of obtained temporal data, user data, or client device data, wherein the temporal data comprises one or more of a time, a day, or a date, the user data comprises one or more of a role, a group, or a location, or the client device data comprises one or more of a web browser type, an operating system type, or a standalone application type.

20. The enterprise network system of claim 16, wherein each of at least a subset of the access points comprises a graphical indication of one of the subset of the allowed web applications and is prioritized in the webtop based on an order or grouping and according to the determined indication.

* * * * *